United States Patent [19]
Stevenson et al.

[11] Patent Number: 4,791,550
[45] Date of Patent: Dec. 13, 1988

[54] HIGHER ORDER LANGUAGE-DIRECTED COMPUTER

[75] Inventors: David R. Stevenson, Los Altos Hills; Michael T. Devlin, Sunnyvale, both of Calif.

[73] Assignee: Rational, Santa Clara, Calif.

[21] Appl. No.: 103,123

[22] Filed: Sep. 30, 1987

Related U.S. Application Data

[63] Continuation of Ser. No. 701,190, Feb. 13, 1985, abandoned.

[51] Int. Cl.[4] .......... G06F 9/44
[52] U.S. Cl. .......... 364/200
[58] Field of Search ... 364/200 MS File, 900 MS File

[56] References Cited

U.S. PATENT DOCUMENTS

| | | | |
|---|---|---|---|
| 3,639,912 | 2/1972 | Campbell | 364/200 |
| 4,071,890 | 1/1978 | Pandeya | 364/200 |
| 4,084,224 | 4/1978 | Appell et al. | 364/200 |
| 4,084,228 | 4/1978 | Dufond et al. | 364/200 |
| 4,104,718 | 8/1978 | Poublan | 364/200 |
| 4,231,087 | 10/1980 | Hunsberger | 364/200 |
| 4,325,120 | 4/1982 | Colley et al. | 364/200 |
| 4,389,706 | 6/1983 | Gomola et al. | 364/200 |

*Primary Examiner*—David Y. Eng
*Attorney, Agent, or Firm*—Blakely, Sokoloff, Taylor & Zafman

[57] ABSTRACT

A higher order language-directed computer architecture particularly adaptable for fourth generation program languages. The computer includes a memory which stores package modules and task modules for programs, each of which includes a control segment representing control for the module, a code segment representing instructions for the computer relating to the module, a data segment, a type segment representing type descriptors declared for the module, a queue segment containing synchronization messages for controlling queuing between task modules and an import segment containing lists of objects outside a module which are accessible within the module. The computer simultaneously manipulates portions of the segments based on instructions in the code segment.

19 Claims, 18 Drawing Sheets

HIGHER ORDER LANGUAGE-DIRECTED COMPUTER

This is a continuation of application Ser. No. 701,190, filed 2-13-85, now abandoned.

BACKGROUND OF THE INVENTION

1. Field of the Invention

The invention relates to a digital computer, and more particularly, to a language-directed computer.

2. Prior Art

A digital computer generally executes one or more sequences of instructions which represent computer programs. These instructions, by way of example, perform manipulations of data stored in memory devices of the computer. Often, the computer programs are originally written in a high-level programming language and then undergo a translation process which causes the programs to be represented in a form interpreted by the computer. The architecture of the computer determines the form in which these programs are represented to the computer. In addition, the architecture defines the representation of data in the computer and the operations which are available to name and manipulate that data. In most computers and computer systems, there is an extreme difference between the manner in which data and algorithms are represented in the languages used to write computer programs and the form into which these items must be transformed for execution on the computer. This difference is termed the semantic gap between the languages and the architecture. In a language-directed computer the semantic gap is reduced, that is, the representation and manipulation of objects in the source programming language and by the architecture of the computer are similar.

Object oriented computer architectures which directly support data abstraction, information hiding, modularity, etc., are known. An object oriented computer is described in U.S. Pat. No. 4,325,120.

As will be seen, the present invention provides a new computer with novel architecture, particularly useful for a fourth generation computer language such as Ada.

SUMMARY OF THE INVENTION

A language directed digital computer for operating on a program which program includes a plurality of modules is disclosed. The computer includes a memory which stores for each of the modules (i) a control segment representing control information for the module, (ii) a code segment representing instructions for the computer for that module, (iii) a data segment, and (iv) a type segment representing type descriptors declared for the module. A processing means, which is coupled to the memory, simultaneously manipulates portions of the control, data and type segments based on instructions in the code segments. In the presently preferred embodiment, two additional segments are used specifically, a queue segment containing queuing messages for controlling synchronization between modules representing tasks, and an import segment containing lists of objects outside a module which are accessible within the module.

TABLE OF CONTENTS

Figure 1:
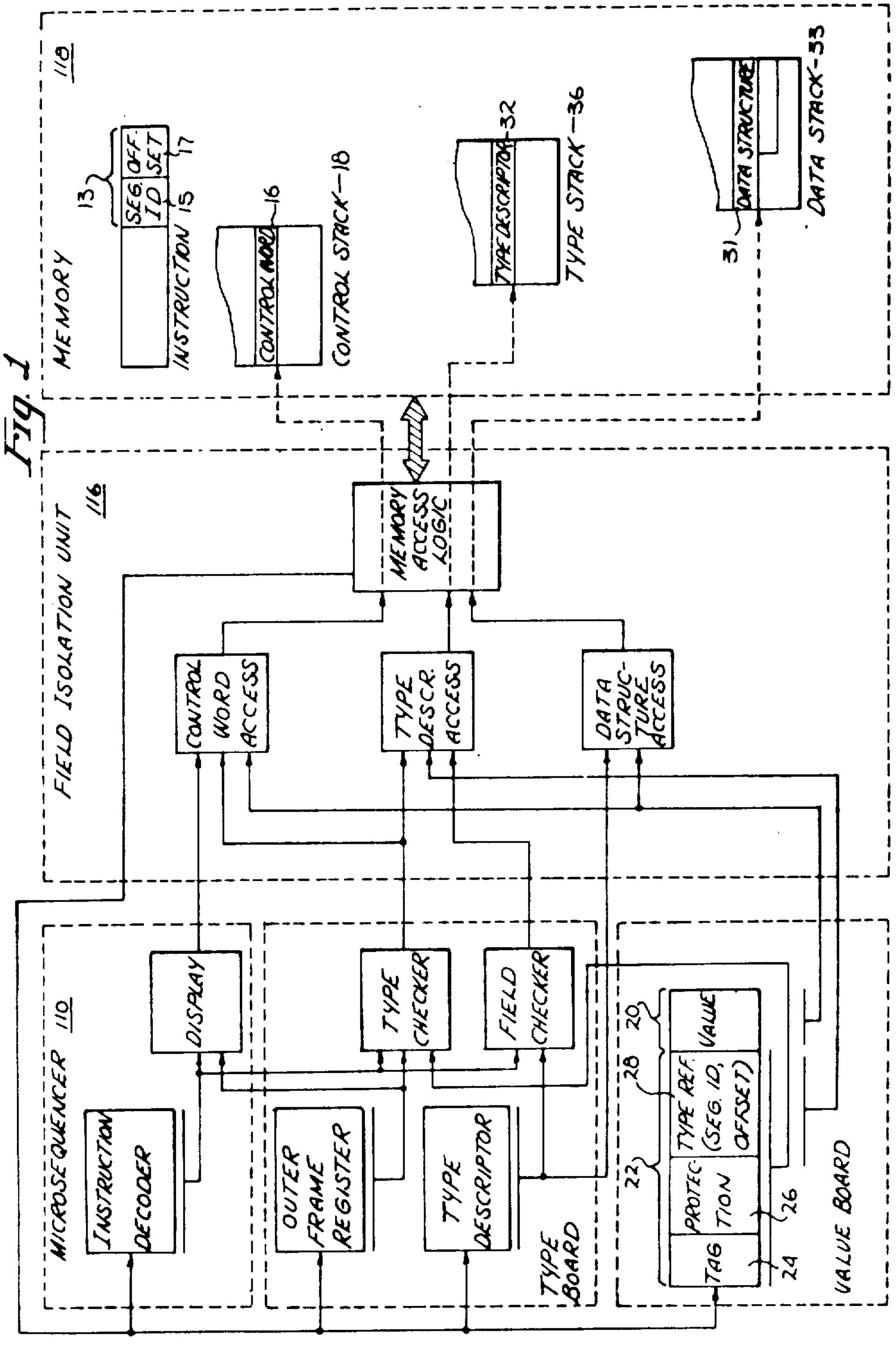
FIG. 1 is a block diagram illustrating various components of the present invention in relation to various system objects stored in memory.

Background of the Invention
Field of the Invention
Description of the Prior Art
Brief Summary of the Invention
Brief Description of the Drawings
Table of Contents
Introduction
PART I. ARCHITECTURE
1. Overall View of Architecture
2. Definitions
3. Basic Runtime Structure
A. Code Segment or Stack
B. Control Segment Stack
C. Type Segment or Stack
D. Data Segment
E. Queue Segment
F. Import Segment
G. Segment Word Formatting
4. Memory Structure and Addressing
5. Creation and Deletion of Modules
6. Subprograms
PART II. COMPUTER HARDWARE
1. Overview of Hardware
2. Microsequencer
A. Resolve Circuit
3. Value Board Logic
4. Type Board Logic
5. Field Isolation Unit
PART III. TYPICAL COMPUTER OPERATION
1. ADA Program Fragment
2. Microsequencer Operation
A. Load 1, 14
B. Load 0, 1
C. Execute package Field_Execute, 16
D. Load 2, −1
E. Execute Record, Field-Read
E. Exit_Subprogram 1, With_Result
G. Store 1, 15
Timing Charts

TABLES

Table 1 is a list of the instructions and the specific codes assigned to the instructions in the presently preferred embodiment.

Table 2 is a description of the key instructions set forth in Table 1.

Table 3 is a definition of the segment word formats used in the presently preferred embodiment of the computer.

DETAILED DESCRIPTION OF THE INVENTION

INTRODUCTION

A higher order language-directed computer architecture and apparatus is described. In the following description, numerous specific details are set forth to provide a thorough understanding of the present invention. It will be obvious to one skilled in the art, however, that the present invention may be practiced without these specific details. In other instances, well-known circuits and programming techniques are not described in detail in order not to unnecessarily obscure the present invention.

The computer of the present invention is particularly useful in connection with fourth generation computer languages such as Ada. It, in effect, executes these higher order language programs more in the manner in which they are written than in the manner executed by a typical computer. In the presently preferred embodiment, Ada is used as a source language, although the invention is not limited to this particular language. The Ada program in the presently preferred embodiment is converted to an intermediate language, namely DIANA, using known front-end processing for use in the invented computer.

The computer of the present invention may be used to execute the higher order language programs as part of a system (e.g., control system), or as a tool in developing programs initially written in a higher order language for operation on other computers, in addition to other uses.

PART I. ARCHITECTURE

1. Overview of Architecture

Computer architectures are traditionally characterized by their instruction set. However, the architecture of the computer of the present invention is best understood by examining the runtime representation of a program, and more particularly, program modules. Thus, much emphasis will be placed in the following description on the runtime representation.

The runtime representation for each module of the program includes a plurality of segments which are stored in memory. These segments are sometimes referred to as "stacks" because of their organization in memory. A control segment, code segment, data segment, type segment, queue segment and import segment are stored within the memory. The control segment contains local expressions, variables, parameters, activation records and also the module state. The control segment also includes pointers which point to type descriptors in the type segment. The code segment contains the executable code for the bodies of the modules. The data segment is used to store the more complex data structures such as records and arrays. The type segment contains descriptors for types declared in the module. The import segment contains information controlling closed scoping, that is, it enables limitations on the open scoping associated with Ada and other higher order languages. The import segment contains lists of objects outsides the module which are accessible within the module. The queue segment, which is used for the task modules, controls synchronization between task modules. These segments provide other functions which are described in more detail in the application.

In general, the instructions for the code segment includes information used to access the control segment. The control segment includes data (simple data) or a pointer to data in the data segment. The control segment also includes, as mentioned, a pointer to a type descriptor in the type segment.

2. Definitions

In general, the definitions used in the industry, particularly for modern fourth generation computer languages, are applicable to the present application. The specific definitions found in the *Reference Manual for Ada Programming Language,* United States Department of Defense, Feb. 17, 1983, ANSI/MIL-STD-1815A-1983 may be used. Other terms used in this application will be defined where appropriate.

Some definitions and concepts useful in understanding this application are:

"Module" is a program unit such as an Ada package or task

"Parent Module" refers to the module declaring a new module in the creation of modules and the term "child module" refers to this new module.

"Class" refers to membership in a relatively small set of categories of data which are recognized and manipulated by the computer. The tag of a control segment word indicates membership in one or more classes. The class of an object determines its representation in memory, thus specifying the primitive means for interpreting the object. Many instructions are represented in such a way that the specification of a class of applicability is extracted during decoding.

"Frame" refers to a group of objects which are declared and are nameable within the instructions corresponding to some region of a program. In a block-structured language, each activation of a subprogram, or block, introduces a frame comprising the parameters to the subprogram and the objects locally declared in the subprogram or block. Each module introduces a frame which includes locally declared objects which are visible, the lexical level of this frame is always one. A frame associated with the activation of a subprogram has a lex level one greater than the lex level of the frame in which the subprogram is declared. Hence, if a subprogram is declared directly within a package or task, it will have lex level 2. There can be several objects at, for instance, lex level 3 which are distinguished by an offset or delta.

"Object Reference" is used to indicate a system address either in the form of a lex level/delta in an instruction.

"Logical Address" consists of a memory kind, name and offset.

"Display" refers to the list of frame logical addresses which are accessible at a given point in the execution of a program.

"Execution Environment", when used in connection with an instruction, means all objects which are currently accessible through the display.

3. BASIC RUNTIME STRUCTURE

Each module (package or task) has a unique name. (As previously mentioned, each of the modules comprises a plurality of segments or stacks.) The module name contains an 8-bit "VPID" and a 24-bit "module ID". Each logical memory address comprises 67 bits which includes the 32-bit module name. Three bits of the memory address are used to identify the segment (segment ID). Remaining 32 bits of the address are an offset which define an element or word within a segment. Elements can be a single bit within the data segment.

The VPID refers to virtual processor ID. The VPID allows the modules to be placed into different categories for resource allocations. In the case of multiprocessors a mapping table is used to allow assignment to different processors. In one embodiment of the present invention, up to four computers (referred to as processors) are used in a single system. The VPID can also be used where processors are not so tightly coupled, for instance, for file transfers or coupling to remote processors. Particularly in these latter applications, the number of bits allocated to the VPID and module ID can be reallocated between these two identifiers as required.

In some cases, a module may have several elaborated instances. These modules share a common code segment.

The control segment or stack 18, a type stack 32, and a data stack 33 are shown in FIG. 1.

A. CODE SEGMENT OR STACK

Large modules may require several code segments. The very first word of the code segment contains version, extent and two special instructions, one for exception handling, the other for termination. The remainder of the code segment is organized into sections. The first section contains code for the module body, the other sections contain code for any subprograms declared in the module. Each section includes some exception-handling information followed by the instructions (8 per word) and literals for the declarative part, statement part and exception handlers, in order.

The exception-handling information includes the number of declared locals and the boundaries between declarative, statement and exception handling code. This information allows the computer to determine whether an exception should be propagated immediately (if the exception occurred in the declared or exception-handling code), or whether it should be handled locally after completing any partially evaluated expressions. This exception-handling information effectively takes up the space of the first three instructions of each section. This leaves space for five instructions in the first word of a section.

A code segment address uses a 15-bit offset. Each instruction is 16-bits in length, therefore each memory access of 128-bit word provides 8 instructions. Relative code-segment addresses are included in the jump and long literal instructions (since literals are stored in the code segment).

Table 1 set forth the list of instructions (instruction set) for the computer. In Table 2, the parameters or fields for key instructions are set forth in addition to the function of the instruction, that is, what the instruction does or which algorithm is implemented. The required arguments required in the various segments (stacks) in addition to those placed (or modified) in the stacks as a result of the execution of the instruction are also set forth. The exceptions which may be raised during the execution and other notes of importance for the instructions are included. Also provided in some cases are intended uses of the instruction in an Ada program.

B. CONTROL SEGMENT OR STACK

The control segment or stack 18 of FIG. 1 is the primary runtime structure for a module. All words on the control stack are tagged. The beginning of each control segment includes a task-control block followed by a series of activation records. The task-control block includes information on the state of the module, resource limits, scheduling, debugging, context information, microstate save areas, etc.

Each activation record consists of a two-word mark followed by one word for each object in the frame. The mark words include the static link and outer-frame pointer (forming an abbreviated display), dynamic link, lex level, return address, and other information. The call and exit instructions, save and restore frame states and implement higher level language semantics (e.g., Ada) for subprogram calls and exits. Addressing is relative to the currently visible activation records. The computer maintains the abbreviated display and performs address computations (converting lexical level and delta into a control-stack address). Parameters are pushed on the segment before invoking a subprogram and are addressed with negative offsets from the mark words.

All types and statically named variables are allocated one word in the control segment. Most objects on the control stack consist of a 64-bit value part and a 64-bit type part. For a type object, the value part is unused. The type part 22 of the word includes a tag 24 indicating the class (package, task, discrete, float, array, record, etc.), information 26 on visibility and protection, and a link 28 pointer to a full type descriptor in the type segment. If the type is declared in the same module as the object, then the type link points to the type segment within the module. Otherwise, the type link points to a type descriptor in another module. The contents of the value part of a control word 16 depends upon the class of object. For discrete, float, access, heap access, package and task objects, the value is represented directly in the control word. For records and arrays, the value part is a data segment reference, pointing to the location of the data structure in the data segment of the module.

A control-stack address uses a 20-bit offset. Control-stack addresses are generated by instructions which include a lex level and delta from the code segment of the module.

All express evaluation and parameter transmission implicitly uses the top of the control stack. All objects are loaded on the top of the control stack before being manipulated.

Seven bits of the type part of each word includes an 8-bit kind descriptor ("of_kind"). These 7 bits define whether the 64-bit value part represents a value itself, or is a pointer to the data segment. An additional 5 bits also provide information on the visibility of the object (which indicates if it is in the visible part of a module). Privacy information about the object indicating whether the object is public (representation available in packages other than where the object is defined), private (accessible only through abstract operations), or local (available only in the package where the object is defined), is determined by these 5 bits. Other information contained within these 5 bits is an indication of whether the object is based on another that was private (derives privacy) and an indication of whether the object is constrained for cases where the 64-bit value part is a pointer to a data structure in the data segment (e.g., array, variant record or access variable).

C. TYPE SEGMENT

The type segment or stack 36 contains type descriptors 32 for the types declared in the module. A single type descriptor is shared by all instances of an object. Type descriptors include information such as the bounds of a scalar type, index bounds and addressing constants for an array type, field type and location for a record field, etc. Type descriptors provide support for address computations, dynamic constraint checking, protection, type conversions, and implementing various attributes.

Like the control segment, the type segment is organized into frames corresponding to the outer package and any subprogram activations. There are no mark words on the type segment; however, top and frame information for the type segment are in the mark words of the control segment.

In addition to holding type descriptors, the type stack holds the child list which lists the names of the children created by a frame. Children include any modules, collections, or import spaces declared in that frame. Basically, this is the list of address spaces which must be reclaimed when exiting a frame. For the outer frame of a package, one of the module-control-block words points to the first-child word in that frame. For subprogram activations, the first word of the type-stack frame is reserved for the first-child word. Since the number of children being declared is not known until complete elaboration of the frame, the child words are scattered between the type descriptors and are connected in a linked list. Thus each child word includes a link, a count of the number of children in this word (0 . . . 3) and the names of up to three children.

A type segment address uses a 20-bit offset which selects a 128-bit word or element from memory. The type segment is of fixed format and word aligned to allow direct hardware support. Segment addresses never appear explicitly in instructions, but are generated implicitly as required.

Whenever an instruction performs an action on an object, the type of the object is checked for compatibility with the object being performed. Unacceptable types cause computer-raised exceptions. The exact function performed by the operation will depend on the type of the operands. For example, ADD will add numbers of various types, performing the appropriate operation based on the actual type.

The type checking permits early detection of inconsistencies in the computer program and contributes to the decrease in debugging time and obviously improves reliability.

D. DATA SEGMENT

The segment stack is organized as a zero to 232 minus one bits and is completely uncontainerized. Data structures (records and arrays) are stored on the data stack and are accessed through variables and expression temporaries in the control segment as mentioned. A data structure 31 is interpreted in accordance with the appropriate type descriptor 32**. Sizes and intermediate addresses are computed when the type descriptor is elaborated, based on any dynamic constraints. The sizes represent the minimum number of bits required to represent the object, and the object is stored in this minimal representation in the data stack.

A data segment address uses a 32-bit offset. Selection of a 1-bit word is possible, for instance, through the field isolation unit (FIU) as is described later. Data segment addresses never appear explicitly in instructions, but are generated implicitly as required.

E. QUEUE SEGMENT

A queue segment is associated with every module which is a task. The queue segment is organized into a series of linked lists of messages and free space. Each entry variable of the control segment (or on the data segment if it is a member of an entry family) contains a pointer to the head of the corresponding free list, and pointers to the head and tail of the corresponding message list. The first word in the queue address space is reserved for resource management information (current extent of the address space, maximum extent permissible, etc.).

A queue address used a 20-bit offset. Queue addresses do not appear explicitly in instructions, but are generated implicitly as required. Each queue word in the queue segment is 128 bits wide.

F. IMPORT SEGMENT

In some higher order languages each module is an open scope; that is, all objects declared in an outer module before the declaration of an inner module, are visible within that inner module. For improved security and efficiency, the present invention treats modules as closed scope. From the point of view of the instruction set, the basic addressing mechanism involves referring to objects in the control segment by a static lexical level (0 . . . 15) and relative offset or delta. Lexical level 1 corresponds to the outer frame of a module, as mentioned. Lexical level 0 refers to the import segment associated with the module type. Thus the import space can be viewed as a shared outermost control segment frame for all modules of the same type.

When a parent module elaborates the declaration of a module visible part, it first places (pushes) a list of objects (types and variables) in its control segment. These objects are imported by the child module, and are therefore placed in an import segment created for that module. Further imports may be provided when elaborating the declaration of the module body. This approach gives the parent explicit control over the portions of the current environment which are available to the child. Thus the import space can also be viewed as an access-rights list.

An import-segment address uses a 9-bit offset. Import addresses are generated by instructions from the code segment which refer to lexical level 0.

G. SEGMENT WORD FORMATTING

Specific segment word formatting (or word definition) for the currently preferred embodiment is set forth in Table 3. Definition of the 7-bit type descriptor ("of kind") is also set forth. The control segment begins under the heading "record activation state". The formatting encompasses a multiprocessor application permitting each module to be assigned to a particular processor. (In examining this table, it should be noted that reference to segment refers to the code segment.)

4. MEMORY STRUCTURE AND ADDRESSING

Figure 2:
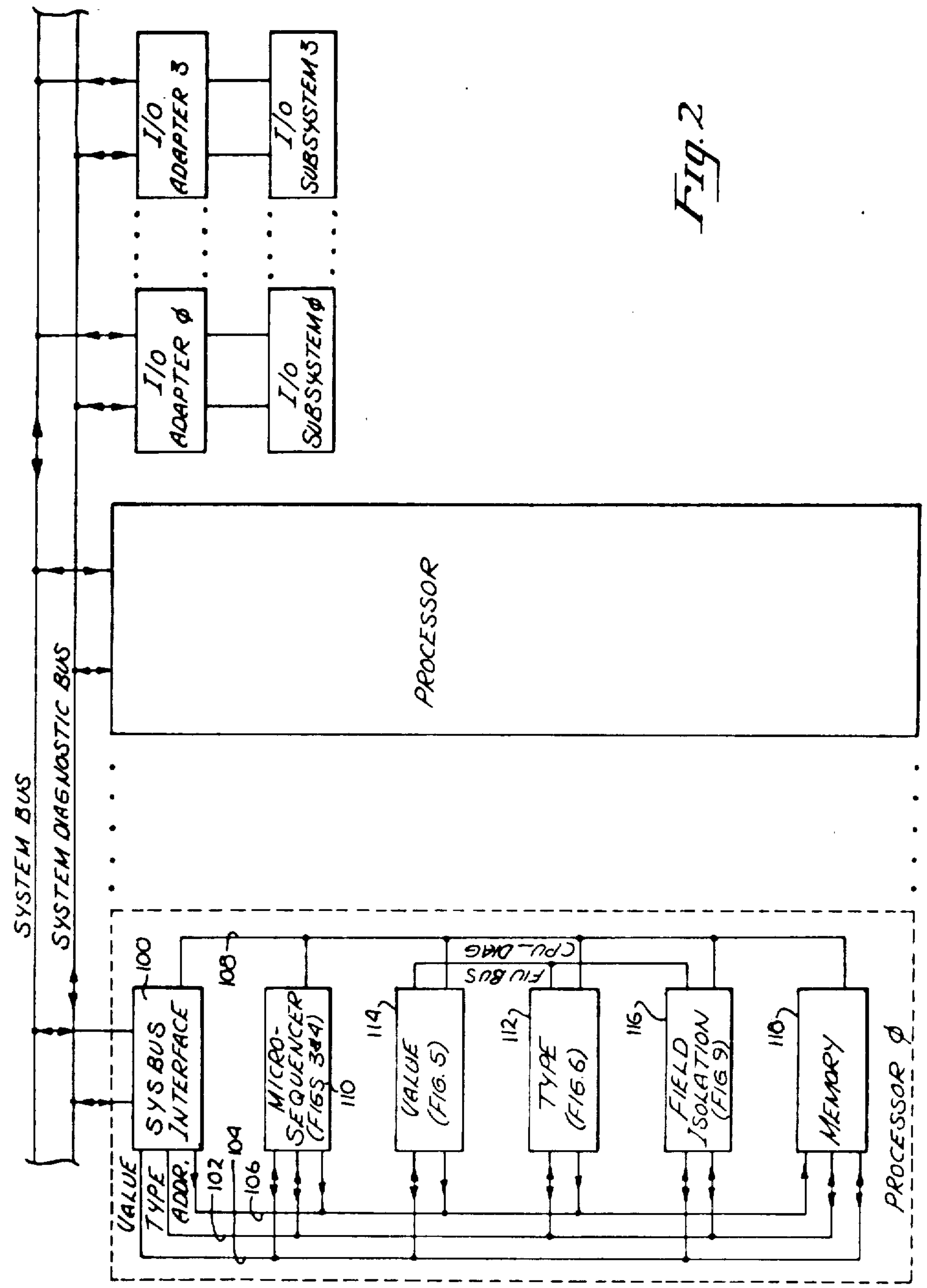
FIG. 2 is a block diagram of a multiprocessing system in which the computer of the present invention may be used.
Figure 19:
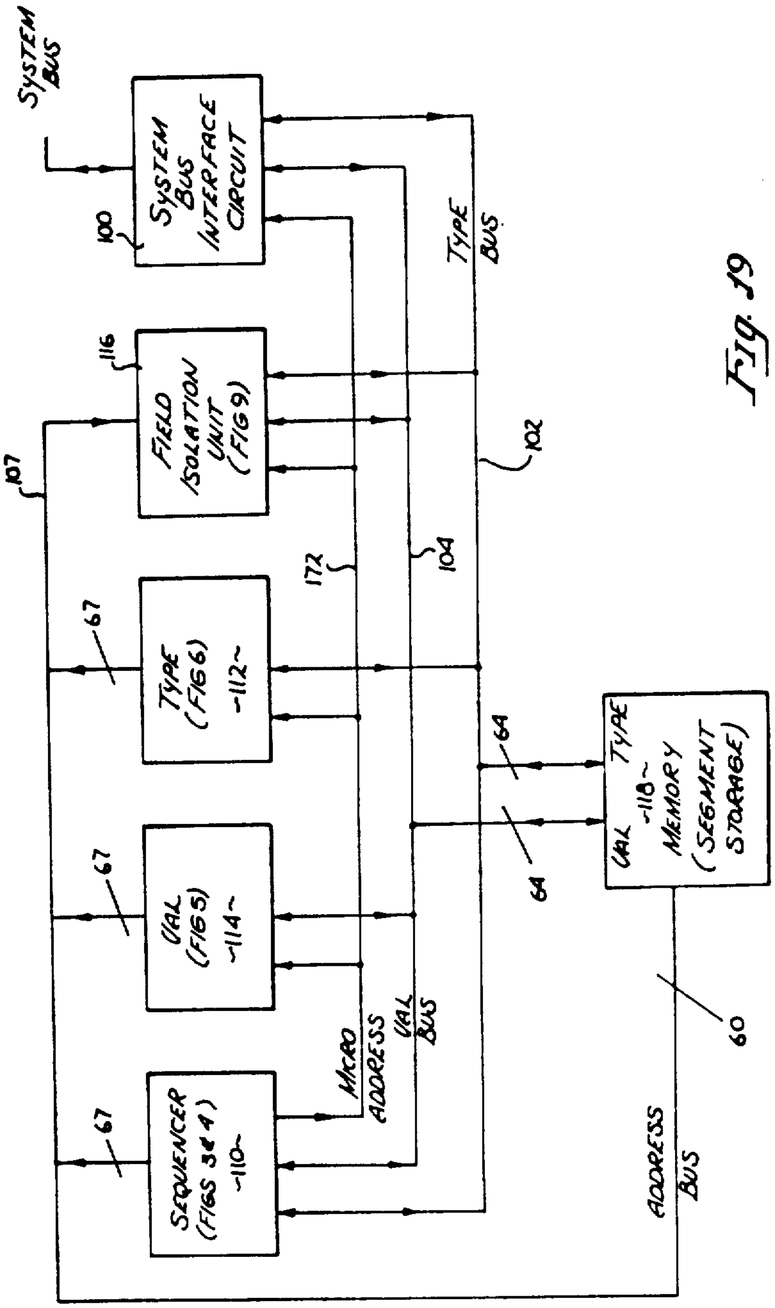

The memory 118 shown in FIGS. 2 and 19 is a typed segment-memory system. The memory is divided into a number of variable-sized segments, each of which has a sort. The sorts are: control segment or stack (CS), program segment (PS), data segment or stack (DS), type segment or stack (TS), queue segment (QS), and import segment (IS).

In the presently preferred embodiment of the invention, data/information/messages are containerized in the CS, TS, and PS, meaning that objects are of fixed size and aligned. The data segment is not containerized, allowing optimal storage packaging (e.g., single bit packing is possible through the FIU). Objects are first brought to the control segment before being operated on. This allows an implementation that optimizes operation on fixed-sized objects; variable sized packed structures are extracted and replaced in their memory segments and converted to fixed-sized objects prior to actual use. This provides advantages of both fast operation on fixed-size objects and excellent packing density with objects of arbitrary size and structure.

Addressing modes specifically designed for accessing objects of particular types (e.g., arrays, records of data segments) are used. The following table summarizes the addressing modes:

| Name | Parameters | Use |
|---|---|---|
| CS Object | Lex Level, Delta | Accessing any statically named object |
| PS Relative | Offset | Branches within a program segment. |
| PS Absolute | Segment ID, Offset | Program segment branches |
| Array | Subscripts | Array element access. |
| Record Field | Field number | Record field access. |
| Package Field | Field number | Inter-package access to data or subprogram. |

The following table summarizes memory reference structures. Numbers by themselves indicate the number of bits in the field. Angle brackets enclose reference structures with substructure.

| | | |
|---|---|---|
| Code segment reference | | |
| REFERENCE: | WORD: 9; INSTRUCTION: 3 | (12 bits) |
| ADDRESS: SEGMENT: 20; | WORD: 9; INSTRUCTION: 3 | (32 bits) |
| JUMPOFFSET: 11 (signed) | | |
| CASEMAXIMUM: 9 | | |
| Segment reference (of any class) | | |
| ID: 24 | | |
| MODULEID: 24 (w/bit 23 = 0) | | |
| COLLECTIONID: 24 (w/bit 23 = 1) | | |
| NAME: PROCESSOR: 8; NUMBER: ID | | (32 bits) |
| Control segment reference | | |
| OBJECTREFRENCE: LEXLEVEL: 4; OFFSET: 9 (signed) | | (13 bits) |
| CONTROLREFERENCE: STACK: NAME; OFFSET: 20 | | (52 bits) |
| Type segment reference | | |
| TYPEDISPLACEMENT: 20 | | |
| TYPEREFERENCE: STACK: NAME; OFFSET: TYPEDISPLACEMENT | | (52 bits) |
| Data segment reference | | |
| DATAREFERENCE: STACK: NAME; OFFSET: 32 | | (64 bits) |
| CHILDPOINTER: OFFSET: TYPEDISPLACEMENT; 2 | | (22 bits) |
| IMPORTNAME: PROCESSOR: 8; NUMBER: 24 | | |

5. CREATION AND DELETION OF MODULES

New modules are instantiated through a multistep process. Tasks and packages are instantiated in much the same way except for a few differences near the end of the process.

The parent executes a DECLAREVARIABLE instruction to declare the child. This causes a "declare" message to be sent to the system which results in the creation of appropriate segments for the child. The child then begins execution by executing the code to elaborate its visible part. The child executes an ACTION ACCEPT_ACTIVATION to indicate that the elaboration of its visible part is complete. This causes a "declared" message to be sent back to the parent which then continues executing.

The parent executes an ACTION ACTIVATE_TASKS if the child is a task, or an Execute Module, Activate if the child is a package. This results in an "activate" message being sent to the child. The child then elaborates its body and, if it is a package, executes its body. Next it sends a "signal-activated" message back to the parent. If the child is a task, concurrent execution begins at this point.

The parent continues sequential execution when it receives the "signal-activated" message. If the child is a task, it continues executing as well.

The following instructions deal with modules:

| | |
|---|---|
| DECLARE_TYPE | Declare a module type |
| DECLARE_VARIABLE | Create a module instance |
| EXECUTE PACKAGE, FIELD_READ | Read a field of a module (from its visible part) |
| FIELD_WRITE | Write into a field of a module (from its visible part) |
| FIELD_EXECUTE | Invoke a visible field of a module |
| EXECUTE MODULE, ACTIVATE | Elaborate a module pointed to by an access variable |
| ACTION ACCEPT_ ACTIVATION | Inform parent that elaboration of visible part is complete |
| ACTION ACTIVATE_ TASK | Tell a child task to begin |
| ACTION SIGNAL_ ACTIVATED | Inform parent that elaboration of body is complete |
| EXECUTE MODULE, GET NAME | Construct a module variable for the current module |

6. SUBPROGRAMS

Subprogram invocations allocate a new frame in the control stack of the invoker. This frame contains a marker having the following information:

Subprogram return address
Data segment frame pointer
Type segment frame pointer
Package-level frame pointer (outer block scope)
Enclosing frame pointer (most recent lexical level) ("static link")
current lexical level
Previous frame pointer ("dynamic link")

The general approach is to create a new stack environment (frame) that will be eliminated when the subprogram returns, restoring the current environment. Subprograms may have local package or task objects declared within them. Restoration of the pre-invocation environment requires the termination and deallocation of any local modules.

All resources allocated must be accounted for. This is done by recording allocations on what is called the "child list", which lists resources that must be freed on subprogram return. The child list is kept on the type segment, this being a convenient space for this listing.

The specific resources accounted for on the child list are:

Local tasks
Local packages
Collections associated with local access types.
Import segments associated with local modules types.

The accounting of resources created and deallocation on subprogram return are performed by the instructions that create types and objects (Declare_Type and Declare—Variable and that handle subprogram return (Exit—Subprogram, End—Rendezvous).

The following instructions are used to handle subprograms.

| | |
|---|---|
| Declare_Subprogram | Declare a subprogram variable |
| CALL | Invoke a subprogram (possibly waiting for a rendezvous) |
| Execute Any, Run_Utility | Invoke a utility subprogram |
| Execute Package, Field_Execute | Invoke a subprogram in another module |
| Exit_Subprogram | Return from a procedure or a function |
| End_Rendezvous | Return from a rendezvous subprogram |
| Action Pop_Block | Multilevel procedure return |
| Action Pop_Block_With_Result | Multilevel function return |

PART II - COMPUTER HARDWARE

I. OVERVIEW OF HARDWARE

The presently preferred embodiment of the computer of FIG. 1 is shown in FIG. 19 in block diagram form. (The computer is sometimes referred to as a processor in this application, particularly where a plurality of the computers are simultaneously used in a "multiprocessor" configuration.) Each of the computers may be coupled in a multiprocessor configuration through a system bus interface circuit 100 shown in FIG. 19. The system bus employed in this configuration is also used to couple a computer to input/output devices. This system bus along with its distributed arbitration means is described in copending application, Ser. No. 602,154, filed Apr. 19, 1984 and entitled "Computer Bus Apparatus With Distributed Arbitration".

The memory 118 is addressed through the address bus 107. Addresses are generated within the sequencer 110, VAL board 114 and type board 112. Two bidirectional data buses are employed. The VAL bus 104 is coupled to the sequencer 110, VAL board 114, field isolation unit 116 and system bus interface circuit 100. The other bus, type bus 102, is coupled to the sequencer 110, type board 112, field isolation unit 116 and system bus interface circuit 100. In the currently preferred embodiment, memory 118 has a capacity of 32 megabytes where 256K RAM chips are used. A constant predetermined cycle time is used. The memory along with the field isolation unit are described in copending application, Ser. No. 506,052, filed June 20, 1983, and entitled "Memory System".

Both the VAL board 114 and type board 112 are in themselves each processing means which permits simultaneous manipulations of data under control of control signals from the sequencer 110. The VAL board is described in this application in conjunction with FIG. 5, and the type board in conjunction with FIG. 6.

Figure 3:
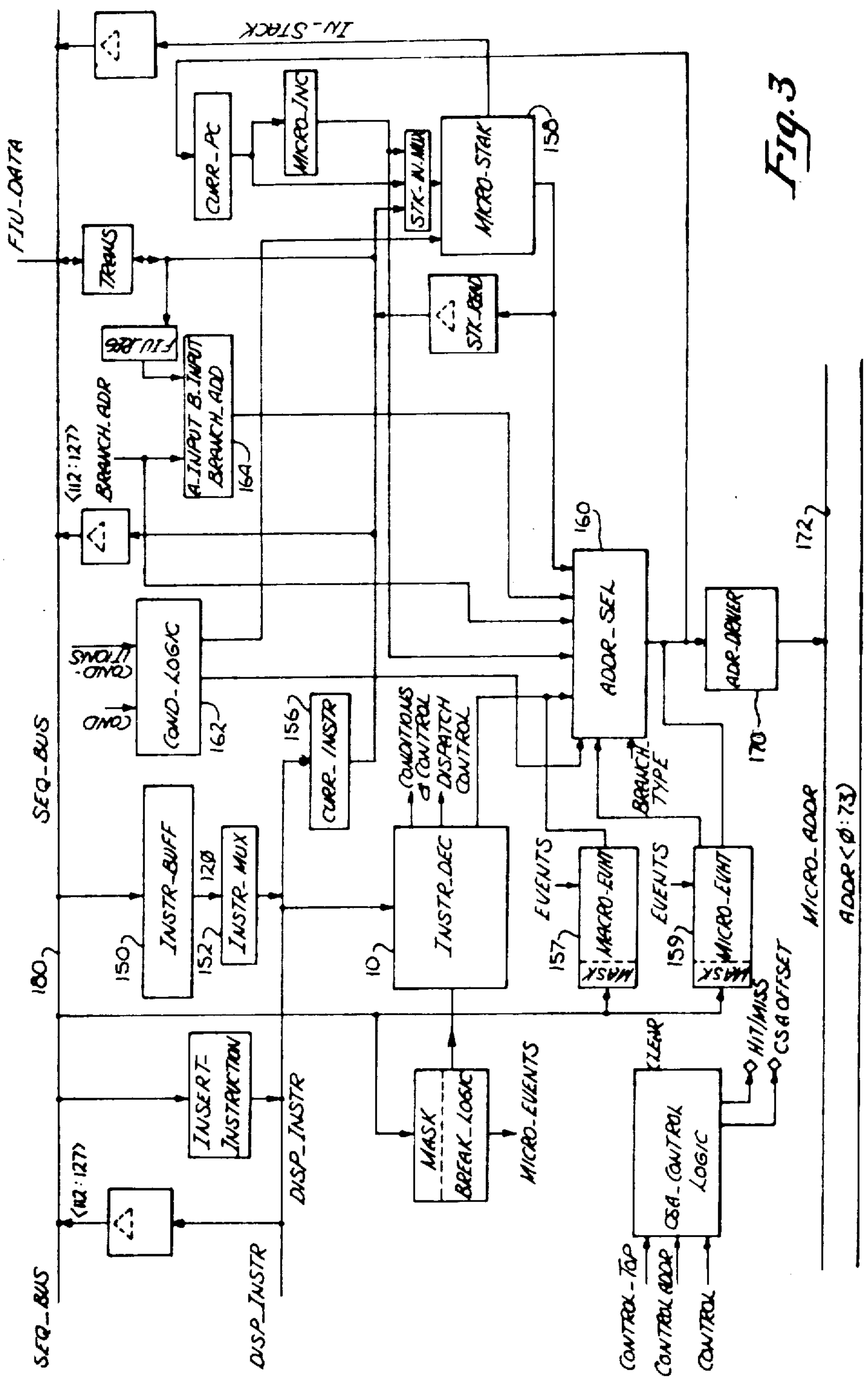
FIGS. 3 and 4 comprise a detailed block diagram of the microsequencer shown in FIG. 2.
Figure 4:
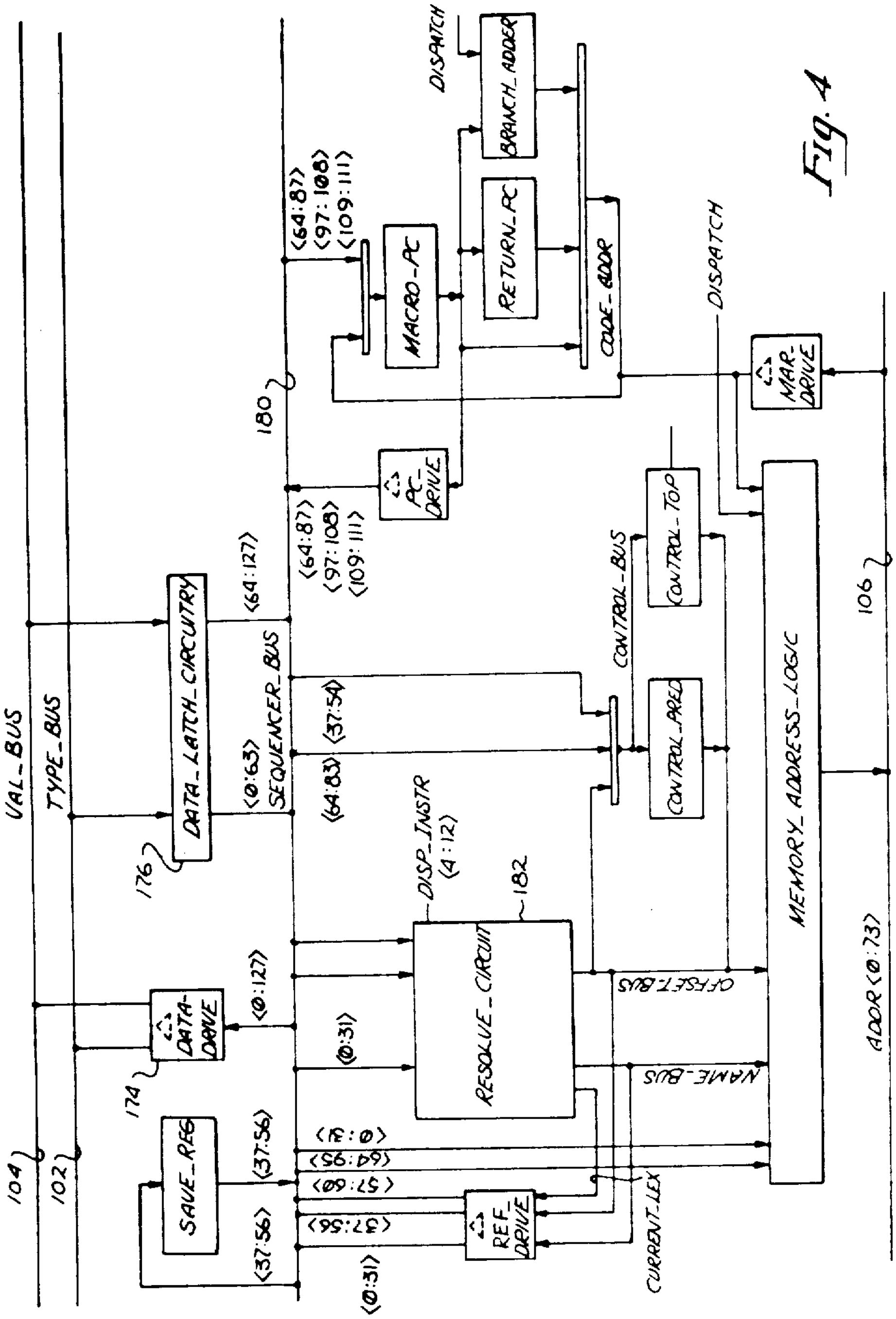

The sequencer, or microsequencer 110 is described in this application in conjunction with FIGS. 3 and 4. The sequencer provides microaddress signals on bus 117 which are coupled to boards 112 and 114, unit 116 and circuit 100. Writable control stores are used on each of these units which are addressed from the microaddress bus 172. This distributed microcode arrangement is described in copending application, Ser. No. 624,142, filed June 25, 1984, and entitled DISTRIBUTED MICROCODE ADDRESS APPARATUS FOR COMPUTER.

Referring to FIG. 2, a number of identical processors as described (Processor 0–Processor 3) are connected by means of the system bus to a number of I/O adapters (I/O Adapter 0–I/O Adapter 3) as described in detail in the above-mentioned copending application. Processor 0 is shown in detail within the dotted lines. Processor 0 and the other processors each include a system-bus interface 100, which connects the system bus with an internal-type bus 102, an internal-value bus 104, and an internal-address bus 106. The system-bus interface also connects a system-diagnostic bus with an internal CPU-diagnostic bus 108.

2. MICROSEQUENCER

The order of execution of microinstructions in the computer is determined by the microsequencer shown in FIGS. 3 and 4. Referring to FIG. 3, the microprocessor includes an instruction buffer 150 for buffering the current 128-bit instruction word which contains eight 16-bit instructions. An instruction mux 152 determines which instruction is to be executed next and passes it on to a current-instruction register 156, which stores the current 16-bit instruction. The instruction MUX 152 is also output to the instruction decoder 10. The instruction decoder 10 and the current-instruction buffer 156 are output to microsequencing circuitry, which includes a microstack 158, address-select circuitry 160 and conditional-branch logic 162, 164. The address-select logic is coupled by means of address drivers 170 to a microaddress bus 172.

A. RESOLVE CIRCUIT

Referring now to FIG. 4, the value bus 104 and the type bus 102 are both coupled by data-drive circuitry 174 and by data-receive circuitry 176, to the internal microsequencer bus 180. The microsequencer bus 180 is coupled to the resolve circuit 182, the purpose of which is to generate control-stack addresses.

The resolve circuit includes a 16-deep RAM for storing 16 lex-level addresses. The resolve circuit has sixteen 52-bit registers, corresponding to each of the 16 lex levels. Thirty-two bits of the registers are stack-name bits (segment number and virtual processor ID), and 20 bits are on offset. There are also 16 validity bits, one corresponding to each lex level, each of which indicates if the contents of the corresponding register is valid.

The resolve circuit also contains a current lex-level register. The lex level 0 register is "imports", the lex level 1 register is the outer frame. The register pointed to by the current lex level is the inner frame. The register at the current lex level minus 1 is the enclosing frame. Unless the lex level is 1, then the inner frame and enclosing frame are the same.

During the dispatch of a macroinstruction that requires the resolution of a lex level delta, the resolve circuit will calculate the control-stack address if the lex level is valid. If the lex level is invalid, a macroevent will be generated. The control-stack-address name is the name portion of the register specified by the lex level (bits 3:6) of the decoding instruction. The offset is the sum of the offset portion of the specified register and bits (7:15) of the decoding instruction (sign extended).

The microsequencer logic can both read and write registers in the resolve circuit. The lex level address field of the microcode specifies how the resolve registers are addressed. The sources for the address are current lex level register, incoming lex level (bits 124:127 of the sequencer bus minus 1), loop counter, zero, one. The address can be used for either reading or writing.

The microsequencer logic can also change the validity bits.

In general, validity bits are addressed at the same time as resolve registers. During any cycle the addressed validity bit can be set, cleared, remain unchanged, or all the validity bits at a greater lex level can be cleared. The validity bits can also be cleared all at once, independent of the lex level address.

The resolve circuit is also used to calculate the control or type addresses that the microsequencer starts during some dispatches.

The TOS latch 175 is used to latch 84 bits of the sequencer bus 180. If, during the execution of a macroinstruction the new TOS (the control stack) is on the VAL and TYPE buses 102 and 104, the value is read onto the sequencer bus and latched into the TOS latch.

The TOS latch also has an associated validity bit. During each successful dispatch the bit is cleared. The bit is set when the latch is loaded. Some instructions will cause a macroevent if the validity bit is not set. The contents of the TOS latch is used during the calculation of some of the memory operations that the sequencer starts during the dispatch of some macroinstructions.

For each executing restartable macroinstruction, the microsequencer stores the correct macro PC. If a microevent handler checks the restartable state before a context switch, the amount of state that needs to be saved can be minimized. (The restartable state is testable as conditions on the sequencer.) There are two bits of restartable state. The restartable bit (first bit) indicates if the macroinstruction is restartable or not restartable. If the instruction is restartable, the address bit (second bit) indicates if the instruction should be restarted at the current macro PC or at the current macro PC minus 1. During the dipatch of each macroinstruction, the restartable bit is set restartable. During a dispatch that causes a macroevent, the second bit is set at macro PC. During any microinstruction the microcode can set or reset each state bit independently.

(Example: If the cache mis-handler checks the state of these bits, it can detect the case where a cache-miss is taken during a macroevent. The bits would be set to restartable, at current macro PC. By detecting this case, the saving of unnecessary microstate is avoided.)

The microsequencer maintains a 15-word-deep LIFO stack of microaddresses in microstack 158. Microaddresses are automatically pushed and popped as a result of some of the branches (call, return) and during events. The microcode can also push FIU DATA (48:63) onto the stack, clear the stack, read the top item, or pop an item off on the stack.

Every time any item is pushed onto the stack, the latched condition is also pushed onto the stack. This bit of the microstack is selectable as a condition. This facility can be useful in the following circumstances.

1. If a microevent handler uses the condition latch, it does not need to execute any microcode to save the previously latched condition. The condition is saved on the microstack. To restore the condition, the return instruction should latch the condition "saved bit from the microstack."

2. During a context switch, the latched condition can be saved on the microstack and restored from the microstack, just as in the above example.

3. A subprogram call that uses the condition latch, but should not destroy its value can also restore the condition. (Many subprograms will not need to restore the condition latch upon return. If a subprogram latches a condition, and does not restore the latch, it actually returns a boolean to the caller.

The microsequencer has two comparators for checking field numbers during the execution of the field operations. Each cause the same microevent—field number error. The variant-field check 157 compares bits (80:88) of the sequencer bus to bits (7:15) of the current instruction. The fixed-field check 159 compares bits (81:88) of the sequencer bus to bits (8:15) of the current instruction. In either case an unequal comparison generates the microevent.

3. VALUE BOARD LOGIC

Figure 5:
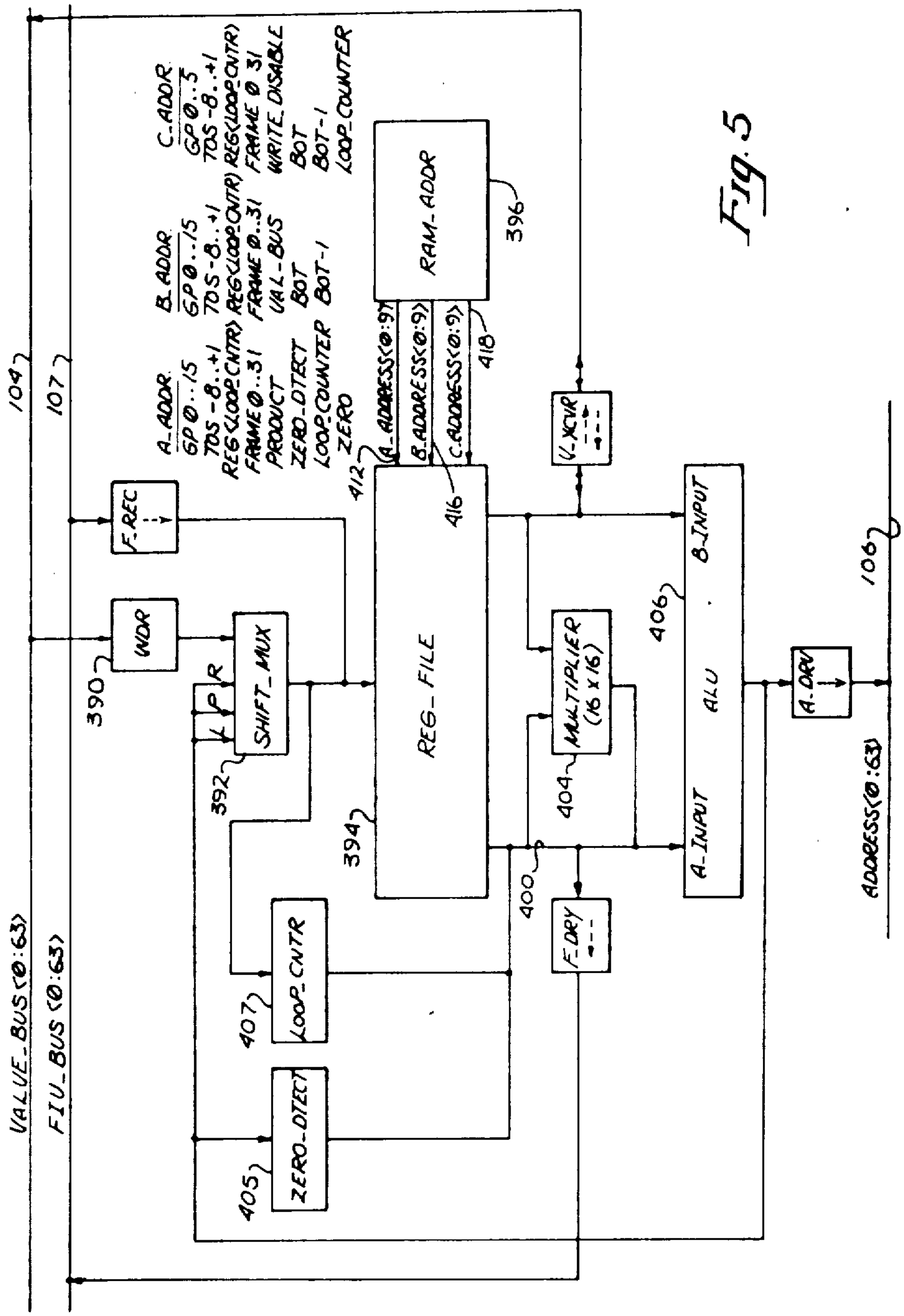
FIG. 5 is a detailed block diagram of the value logic shown in FIG. 2.

Referring to FIG. 5, the value logic 114, shown in FIG. 2, will now be described. The value logic is coupled to the value bus 104 and the address bus 106. The value logic is also coupled to the field-isolation unit 116 by means of the FIU bus 107. The value data from the value bus 104 is distributed by means of write driver 390 to shift-mux A 392 and shift-mux B 394. This provides a dual-port mechanism for entry into a A-port RAM 396 and a B-port RAM 398, which together comprises a register file. The A-port-RAM data is latched in A-latch 400 and the B-port data is latched in B-latch 402. The outputs of these two latches drive a multiplier 404 and an arithmetic-logic unit (ALU 406). The output of the ALU 406 is buffered in buffer 408 which drives the address bus 106. The addresses from the A-port RAM 396 are output by means of A-address mux 410 to A-address buffer 412. The output of B-port RAM 398 drives B-address mux 414, which drives B-address buffer 416. A C-address buffer 418 is provided for deriving an address from both the A-address mux 410 and the B-address mux 414.

The register file is used for storing and retrieving data in the value logic. The register file has a three-address structure. Two locations, designated A and B corresponding to the A and B inputs of the ALU 406, can be independently addressed. These locations can be used either as operands to the ALU 406 or multiplier 404, or as sources to the value data bus 104, or the FIU bus 107. On the same cycle that the A address 412 and B address 416 are read out of the register file, a third location, pointed to by the C address 418, can be written into either to store the result of an ALU operation or to store the data on the FIU bus.

The 64-bit ALU 406 has two inputs, designated A input and B input. The register-file location pointed to by the A address field 412 of the microword, the output of the multiplier 404, the value stored in the zero detector 405, and the value stored in the loop counter 407 are all sources that can be A-input operands. The register-file location pointed to by the B-address field 416 of the microword, and the value on the value data bus 104, are sources that can be B-input operands.

The output of the ALU can either be driven onto the address bus 106, loaded into the loop counter through the shift mux, or loaded into register file-C address through the shift mux 392, 394. The shift mux 392, 394 is a device that selects one of four sources of data for storage into the location of the register file pointed to by the C address.

The multiplier 404 operates on two, unsigned 16-bit quantities, one from the A-port latch 400 and the other from the B-port latch 402, and produces a 32-bit unsigned product that can be used as an A input to the ALU.

The zero detector 405 monitors the output of the ALU and generates testable conditions that indicate whether certain ranges of the ALU output are equal to zero.

The loop counter 407 is a general-purpose, 10-bit counter that is used for two purposes. First, a value in the loop counter can be used by the register file addressing logic to address any A, B, or C location in the register file. The loop counter is also used is as an operand to the A input of the ALU.

4. TYPE BOARD LOGIC

Figure 6:
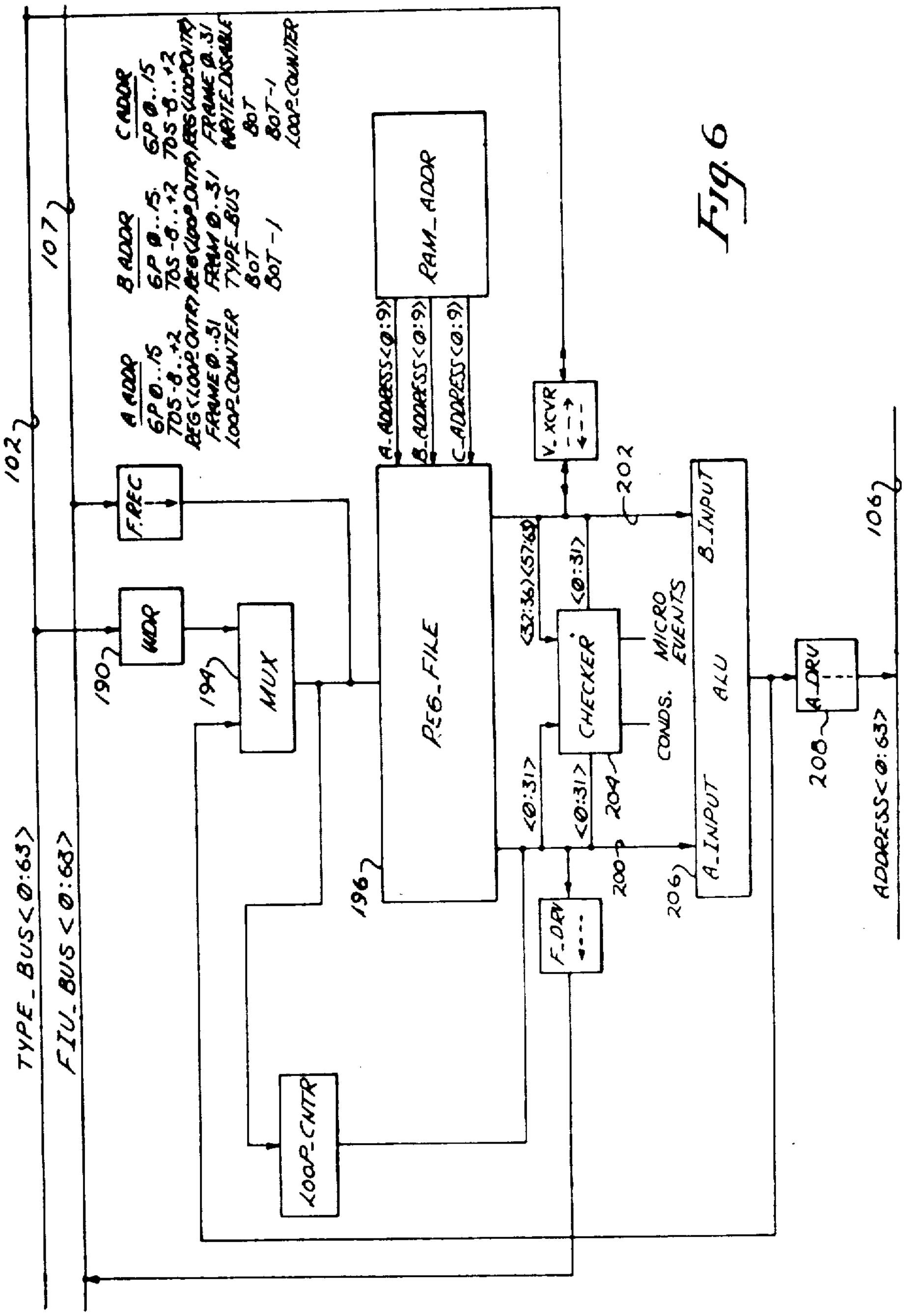
FIG. 6 is a detailed block diagram of the type logic shown in FIG. 2.

Referring now to FIG. 6, the type logic 112, shown in FIG. 2, will now be described. The type logic is coupled to the type bus 102 and the address bus 106. The type logic also couples to the field-isolation unit 116 by means of the FIU bus 107. The type data from the type bus 102 is distributed by means of write driver 190 to mux A 192 and mux B 194. This provides a dual-port mechanism for entry into an A-port RAM 196 and a B-port RAM 198. The A-port-RAM data is latched in A-latch 200 and the B-port data is latched in B-latch 202. The outputs of these two latches drive a type checker 204 and an arithmetic-logic unit (ALU-206). The output of the ALU 206 is buffered in buffer 208 which drives the address bus 106. The addresses from the A-port RAM 196 are output by means of A-address mux 210 to A-address buffer 212. The output of B-port RAM 198 drives B-address mux 214, which drives B-address buffer 216. A C-address buffer 218 is provided for deriving an address from both the A-address mux 210 and the B-address mux 214.

The type logic is similar to the value logic of FIG. 5. Thus the computer has the resources of two 64-bit CPUs operating in parallel. The value logic has a zero detector, a multiplier, and a shift mux, whereas the type logic does not. The type logic, however, has privacy and class-checking circuitry, whereas the value logic does not. The type-checker circuitry 204 includes a privacy checker (FIG. 7) which does a first-level-privacy check on one or two operands, and a class checker (FIG. 8), which does class compatibility of one or two operands, and "of kind" conditions that detect special-type conditions.

The type logic intefaces are similar to the value-logic interfaces, except that the type logic is coupled to the type bus, not the value bus.

Figure 7:
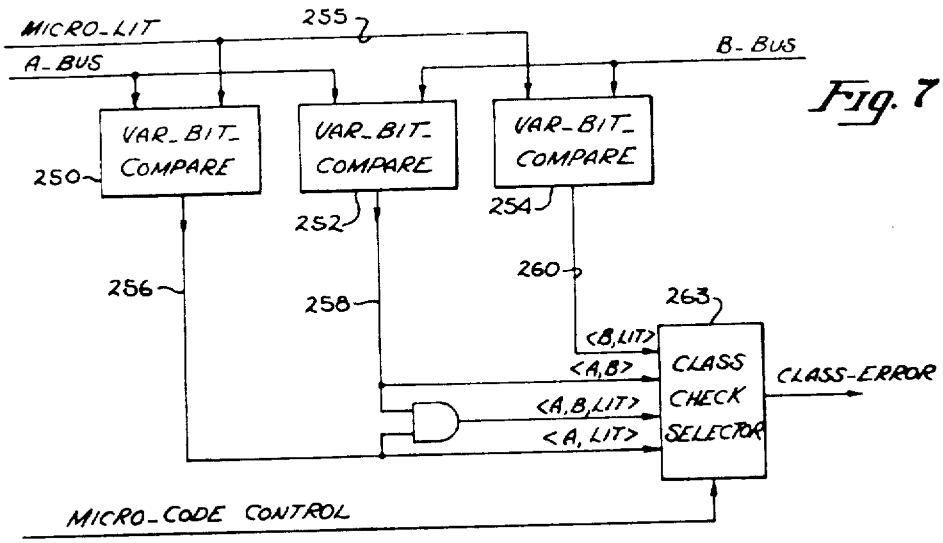
FIG. 7 is a detailed block diagram of the privacy check logic portion of the type checker shown in FIG. 6.

The privacy-check logic within the type checker 204 is shown in more detail in FIG. 7. It includes the outer frame register 44, which is also shown in FIG. 1, and three 32 bit-compare circuits 220, 222 and 224. The A-bus output from A-latch 200 drives compare circuits 220 and 222. The B-bus output from B-latch 202 drives the compare circuits 222 and 224. The outer-frame-name register 44 drives the two compare circuits 220 and 224. With this arrangement, the frame name on the A-bus can be compared with the contents of the frame-name register 44 in compare circuit 220, the frame name on the B-bus can be compared with the contents of the frame-name register 44 in compare circuit 224, and the frame name on the A-bus can be compared with the frame name on the B-bus in compare circuit 224.

If an operand in an instruction is private, or limited-private, then the instruction must be executed within the scope of privacy, that is, in the body of the module where the type is defined. An instruction is executing in the scope of privacy if the segment ID of the outer-frame pointer stored in the outer-frame register 44, which points to the global level, is the same as the segment ID of the type-descriptor pointer, causing an output 228. Similarly, the instruction is executing in the scope of privacy if the segment ID of a statically enclosing module is the same as the segment ID of the type-descriptor pointer, causing an output 230. This means that the subprogram executing is declared in the same module as the type. Absence of either of these two conditions will cause a capability error.

The 32-bit outer-frame-name register 44 is loadable from bits (0:31) of the B bus. This register must be reloaded from bits (0:31) of the B bus. This register must be reloaded during every context switch and during some instructions such as call and exit. To use the privacy checker, the type links of the control-stack operands must be on the A bus and/or B bus. The check (is private or derives privacy) is selected from the privacy-check field of the microcode.

The check outputs from the privacy checker are as follows:

1. BIN_EQ—privacy check for equality and assignment. The operands on both the A and B bus are checked.
2. BIN_OP—privacy check for a binary operations. The operands on both the A and B bus are checked.
3. A_OP—privacy check for unary operation, the operand on the A bus is checked.
4. B_OP—privacy check for unary operation. The operand on the B bus is checked.
5. Paths-equal—binary check for the same paths (name and offset) on both the A and B bus.

A privacy check is accomplished as follows. The outer-frame-name register 44 stores a copy of the 32-bit outer-frame name. The name portion of the register file is brought out on the A bus. The privacy information 26 contained in the control word 16 on the control stack (as shown in FIG. 1) is brought into OR circuit 226. If the object to be accessed is private, or derives privacy (i.e., the object is based on another object that was private), then there is an output from the OR circuit 226. The instruction is executing in the scope of privacy if the segment ID of the outer-frame pointer (stored in register 44), is the same as the segment ID of the type-descriptor pointer (B bus), causing an output 228. Similarly, the instruction is executing in the scope of privacy if the segment ID of a statically enclosing module (A bus) is the same as the segment ID of the type-descriptor pointer (B bus), causing an output 230.

Figure 8:
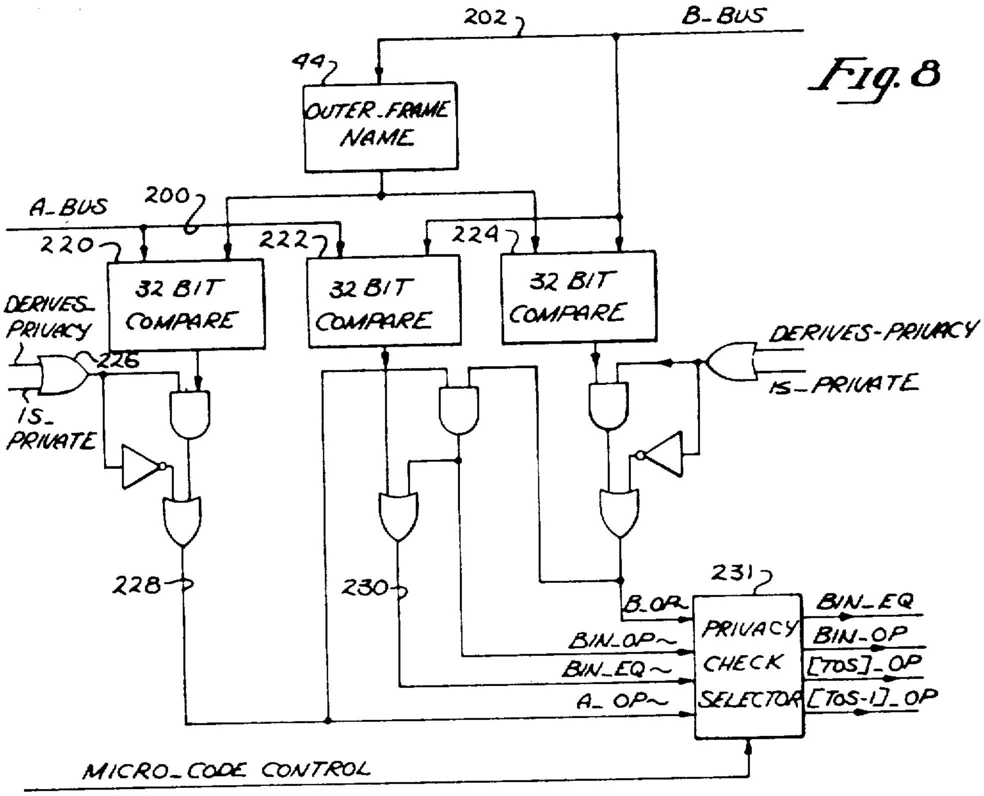
FIG. 8 is a detailed block diagram of the class check logic portion of the type checker shown in FIG. 6.

The class-check circuitry is shown in FIG. 8. The class checker is used to compare the "of kind" bits of a type-link on the A bus or B bus to the other bus and/or to a literal. This check provides a parallel mechanism for ensuring that operands are of the correct or same type for a specific instruction. The class checker is comprised of three variable-bit compare circuit 250, 252 and 254. The microcode literal 255 is brought into the compare circuits 250 and 254. The A bus is brought into compare circuits 252 and 254. Under microcode control a class-error condition is tested for by comparing the A side with the microcode literal and the B side with the microcode literal. It is also possible to test that the A and B sides are equal in compare circuit 252. Thus, if the A side and the literal are equal, an output 256 will be obtained. If the A and B side are equal, an output 258 will be obtained. Similarly, if the B side and the literal are equal, an output 260 will be obtained. The outputs 256 and 258 are combined in AND gate 261 to provide an output 262 if the A side, B side, and literal are all the same. If a class error occurs, a microevent is generated to an event handler which will raise an acception condition.

To summarize, the class-check circuitry is capable of four different 7-bit compares:

1. A bus equals class literal.
2. B bus equals class literal.
3. A bus equals B bus.
4. A bus equals B bus equals class literal.

5. FIELD ISOLATION UNIT

Figure 9:
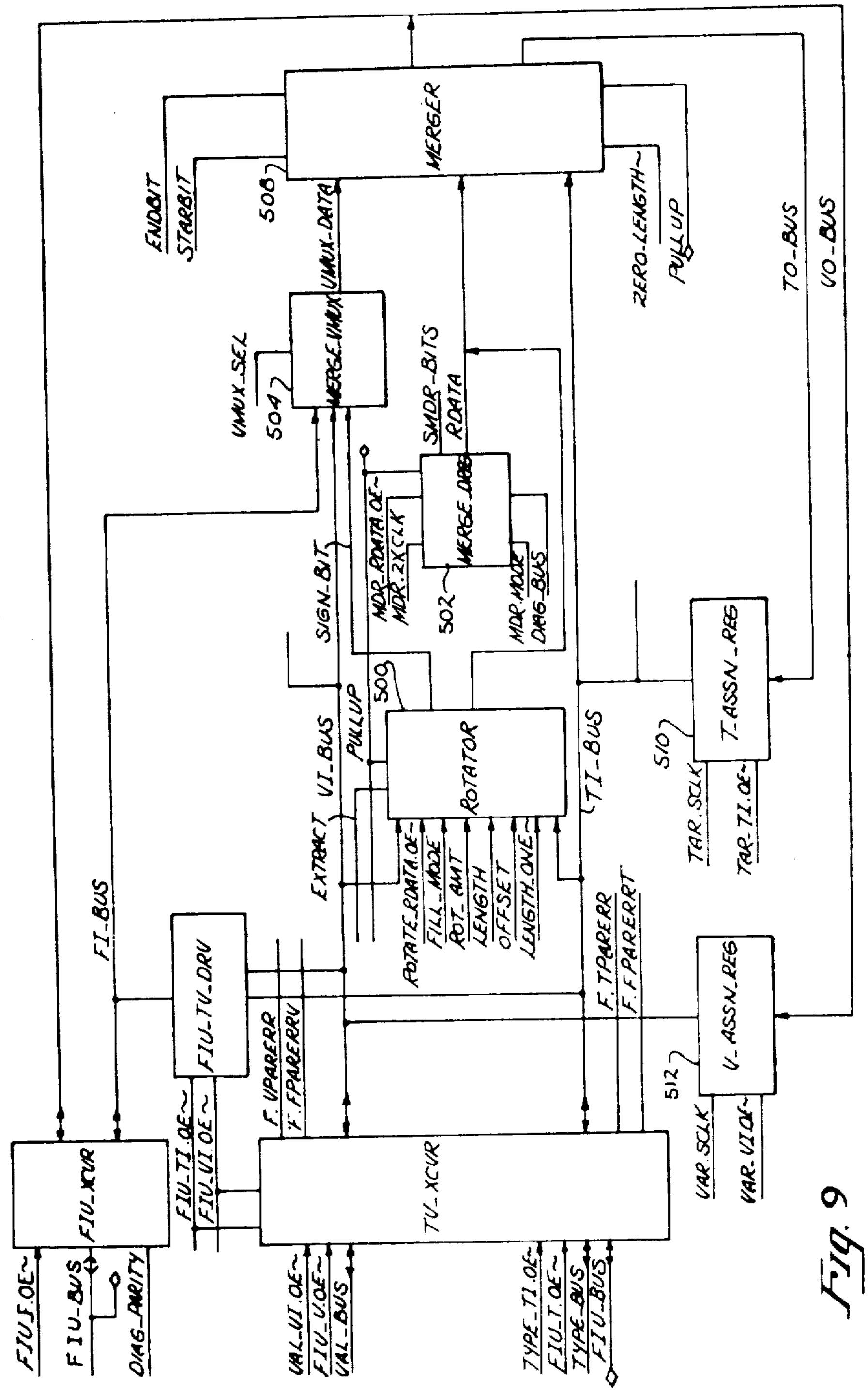
FIG. 9 is a detailed block diagram of the field isolation unit (FIU) shown in FIG. 2.

Referring now to FIG. 9, the field-isolation unit (FIU) is utilized to insert a field of 0 to 64 bits into any position of a 128-bit word, and is utilized to extract a field of 0 to 64 bits from a 128-bit word. The FIU interfaces to the type data, value data, and FIU data buses. The extracted data is right-aligned on the value half of the FIU output and can be sign-extended or 0 filled. The fields being inserted, or extracted, can be defined by their offset and length. For insert, offset is the bit position where the most significant bit of the source data is to be inserted into the result. For extract, offset is the bit position of the most significant bit of the field in the source data. In both cases, length is the length of the field being manipulated. The bit-numbering convention is most significant bit equals 0 and least significant bit equal 27. Inserting a field of 0 length does not modify the destination word, and extracting a field of 0 length returns all 0s. The FIU can also be used for block-copy-and-append operations which can be accomplished with a series of insert and extract operations.

The rotator 500 is used for positioning bit fields for insert or extract operation. When extracting a field, it also outputs the most significant bit of the field being extracted for sign extending. The 128-bit input to the rotator can be rotated by any amount and the appropriate 64-bit slice of the result is output.

The merge-data register 502 is used for storing rotated data which is to be inserted into another 128-bit word, or for holding an intermediate result to be stored in the register file in either the value logic (FIG. 5) or the type logic (FIG. 6).

The merge V mux 504 selects one of four sources of data to be merged with the rotator output on the value half of the merger. The four sources to this mux are the merge-data register, the rotator-sign-bit output 506, the I bus, and the FIU bus 107.

The merger 508 is a 128-bit 2 to 1 multiplexer which merges data from the output of the rotator with data coming from the type bus 102 on the type half, and the merge V-mux 504 on the value half. A merge mask is generated to control the select lines of the merger, using the offset, length, and operation parameters. These parameters are used to calculate a start bit and end bit which mark the beginning and end of the field where the output of the rotator will be selected on the merger outputs.

The type-assembly register 510 and value-assembly register 512 are used for storing intermediate results and are also used when the timing does not allow the results to be written back out into the corresponding register file. The only data path restricted by timing in this way is data being driven from the register file through the FIU data path and out to the register file on the FIU bus.

The memory monitor 516 provides centralized-control logic for controlling the memory 118 shown in FIG. 2. Each memory board in the memory has capacity of eight megabytes, implemented as four associative "sets" of 2048 pages. Each board consists of a set associative-tag-store portion, where associative-address translation and access-control information is stored, and a parallel data array, where data is stored. The memory boards contain all the necessary logic to access, update, and maintain up to 16 associative sets in parallel.

The control logic, which is common to the memory boards, is located in the memory monitor 516. The memory monitor contains the microcode RAMs for the memory-control field, copies of various memory-state registers, and the memory-system control logic. The memory monitor also contains circuitry which tests all control-stack addresses to determine whether they point to the control-stack accelerator (CSA). If such a "CSA hit" occurs, the memory operation is directed to the CSA, located in the value logic and type logic.

PART III. TYPICAL COMPUTER OPERATION

1. ADA PROGRAM FRAGMENT

The following is an example of an ADA program which illustrates how a programmer would program the computer in which the present invention is embodied.

```
ADA Program Fragment
package PROGRAM_FRAGMENT is
end PROGRAM_FRAGMENT;
package body PROGRAM_FRAGMENT is
 package SOME_DATA is
  type ABSTRACT_TYPE is private;
  function EXTRACT_VALUE (FROM_OBJECT: ABSTRACT_TYPE) return
INTEGER;
  function EXTRACT_FLAG (FROM_OBJECT: ABSTRACT_TYPE) return
BOOLEAN;
private
  type ABSTRACT_TYPE is
    record
      VALUE: INTEGER;
      FLAG: BOOLEAN;
    end record;
end SOME_DATA;
task DATA_USER;
package body SOME_DATA is
  function EXTRACT_VALUE (FROM_OBJECT: ABSTRACT_TYPE) return
INTEGER is
    begin
```

-continued

```
    return FROM_OBJECT.VALUE;
  end EXTRACT_VALUE;
  function EXTRACT_FLAG (FROM_OBJECT: ABSTRACT_TYPE) return
BOOLEAN is
  begin
    return FROM_OBJECT.FLAG;
  end EXTRACT_FLAG;
end SOME_DATA;
task body DATA_USER is
 USER_OBJECT : SOME_DATA.ABSTRACT_TYPE;
 USER_VALUE : INTEGER;
 begin
  USER_VALUE :=SOME_DATA.EXTRACT_VALUE (FROM_OBJECT=>)
USER_OBJECT):
 end DATA_USER;
end PROGRAM_FRAGMENT;
```

2. MICROSEQUENCER OPERATION

The following statement from the ADA program fragment set forth above is described in detail below to illustrate the operation of the apparatus in which the present invention is embodied:

USER_VALUE:=SOME_DATA.EXTRACT_VALUE (FROM_OBJECT=>USER OBJECT);

The dynamic sequence of machine instructions which are executed to perform the operation specified by this statement is:

| | | |
|---|---|---|
| (1) | LOAD 1, 14 | —USER_OBJECT |
| (2) | LOAD 0, 1 | —SOME_DATA |
| (3) | EXECUTE PACKAGE, FIELD-EXECUTE 16 | —.EXTRACT_VALUE |
| (4) | LOAD 2, −1 | —FROM_OBJECT |
| (5) | EXECUTE RECORD, FIELD_READ,1 | —.VALUE |
| (6) | EXIT_SUBPROGRAM 1, WITH_RESULT | — |
| (7) | STORE 1, 15 | —USER_VALUE |

Figure 10:
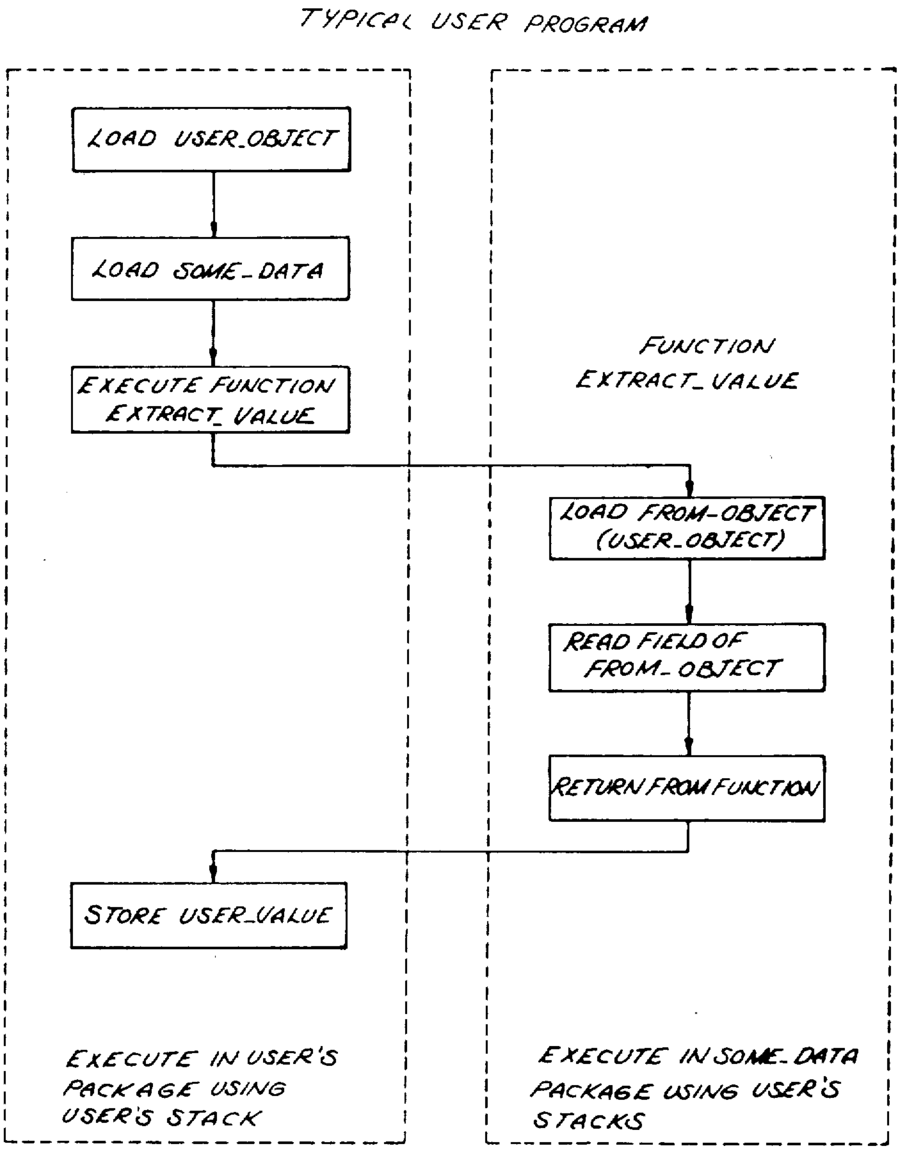
FIG. 10 is a flowchart of a typical user program.

The sequence of operations is illustrated by the flowchart of FIG. 10. The timing of microcycles is shown in Timing Diagrams, Charts 1 through 7.

Figure 11:
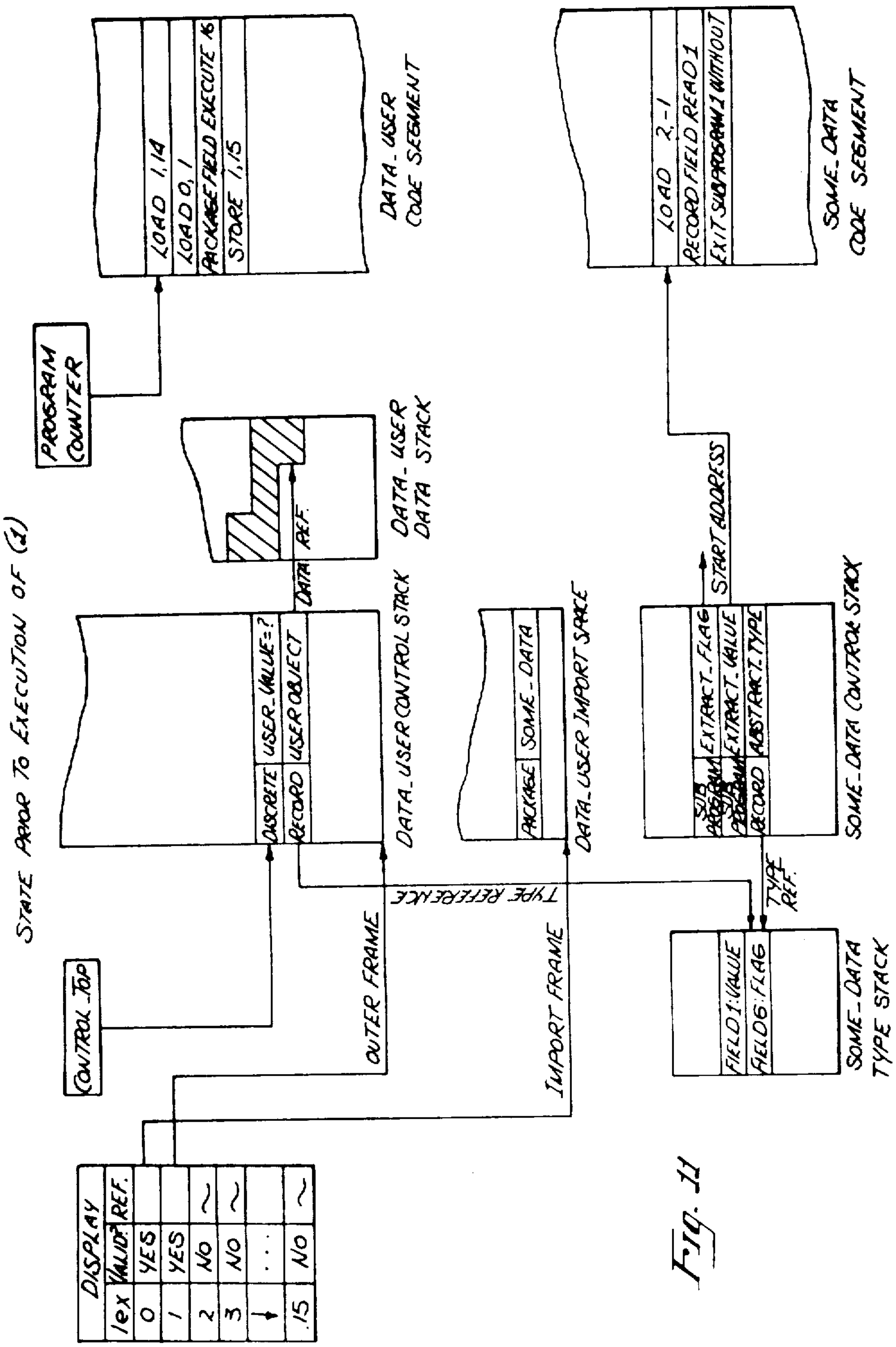
FIGS. 11–18 are a series of drawings illustrating the state of various system objects in memory during execution of the instructions shown in FIG. 10; and, FIG. 19 is a block diagram showing the invented computer in its currently preferred hardware realization.

The contents of the relevant memory segments prior to executing this sequence of machine instructions are shown in FIG. 11.

A. LOAD 1, 14

Figure 12:
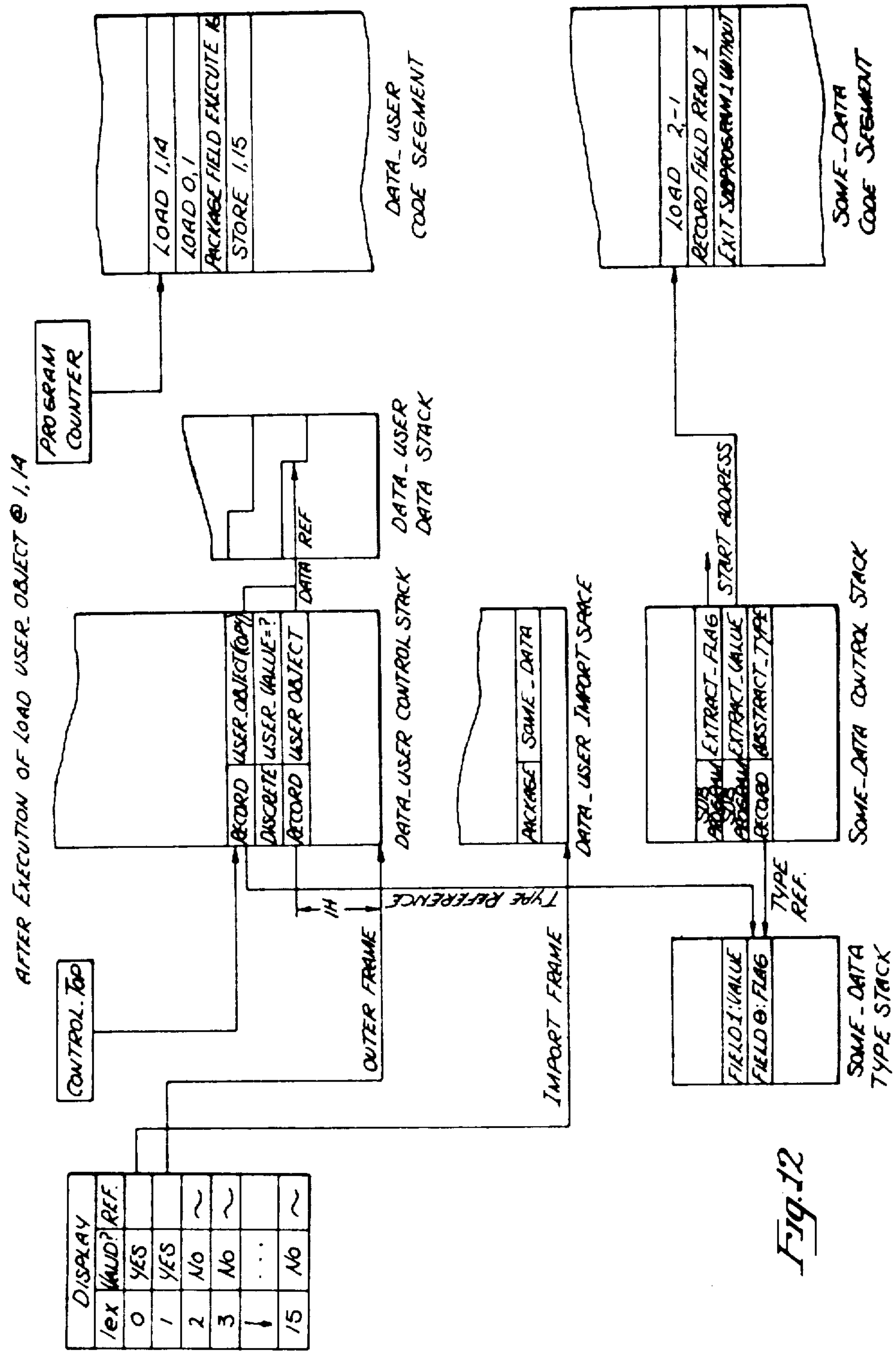

Refer to Timing Diagram, Chart 1. This load instruction takes on copy of the user object at lex level 1 offset 14 and moves it to the top of the control stack so that it is available for manipulation. The contents of the relevant memory segments after executing this instruction is shown in FIG. 12.

The instruction decoding operations are piplined so that the sequencer performs a number of operations before the first microcycle of a particular macroinstruction. Operations that the sequencer performs before the first microcycle are referred to as Microcycle 0, while the first microcycle is Microcycle 1. The load instruction does not specify that anything is needed from the control stack accelerator so this instruction does not require registers to hold the values that are on the top of the control stack. It does, however, need one space free on the top of the control stack because information is placed there. When the sequencer decodes the instruction, it does a computation with respect to the number of registers that are free and the number that are valid and will cause an interrupt to occur before excuting the instruction if those conditions are not satisfied. The load instruction also starts a memory operation, a control read at a lex level/delta.

Microcycle 0 of the load instruction: initiates a read to the logical-memory location at the lex level delta specified in the instruction. This is accomplished by indexing into the display using the lex level. The display is organized from 0 to 15 addresses. In this case, the load instruction specifies Level 1. Each lex level has an "Is Valid" bit associated with it. The display checks the Is Valid bit to determine if this address is valid, takes the offset portion (offset=14), adds it to that address and starts a memory read to that location. The compiler knows that the object at Lex Level 1 Offset 14 corresponds to USER_OBJECT; that is, the object that was declared to be USER_OBJECT in the program. A memory reference takes three cycles. In Microcycle 0 the memory cycle is started, but the data is actually available in Microcycle 2.

Microcycle 1 of the load instruction: The memory takes the logical address (control, segment name, offset), performs an address translation and conducts an associative search using the translated address as a search argument. The memory puts the data in the Read Data Register (RDR) so that it is available during Microcycle 2.

Microcycle 2 of the load instruction: Several sequences take place. the first is a read RDR during which the Read Data Register is read. Read RDR takes the data that memory put in the RDR in Cycle 1 and puts it on the value and type buses so that it is available for the hardware on the type and value boards.

The control stack is split down two sides. One-half is manipulated by the value board and the other half is manipulated by the type board. On the type board, the information returned from memory has the "Is Visible" bit reset, and the data is put onto the top of the control stack. On the value board, the data is put onto the top of the control stack without alteration. Now there is a copy of USER_OBJECT on the top of the control stack. The sequencer maintains a copy of the word on the top of the control stack so that if necessary it starts a memory reference.

On the type board a check circuit checks the tag of each of the words on the control stack. This check circuit ensures that the 7-bit tag in the control word is an appropriate category for a load instruction. If it is, then a dispatch is performed which starts the next macroinstruction.

At this point, as shown in FIG. 12, USER_OBJECT is on top of a control stack, its Is Visible bit is reset, and the control stack is pushed one word.

B. LOAD 0, 1

Figure 13:
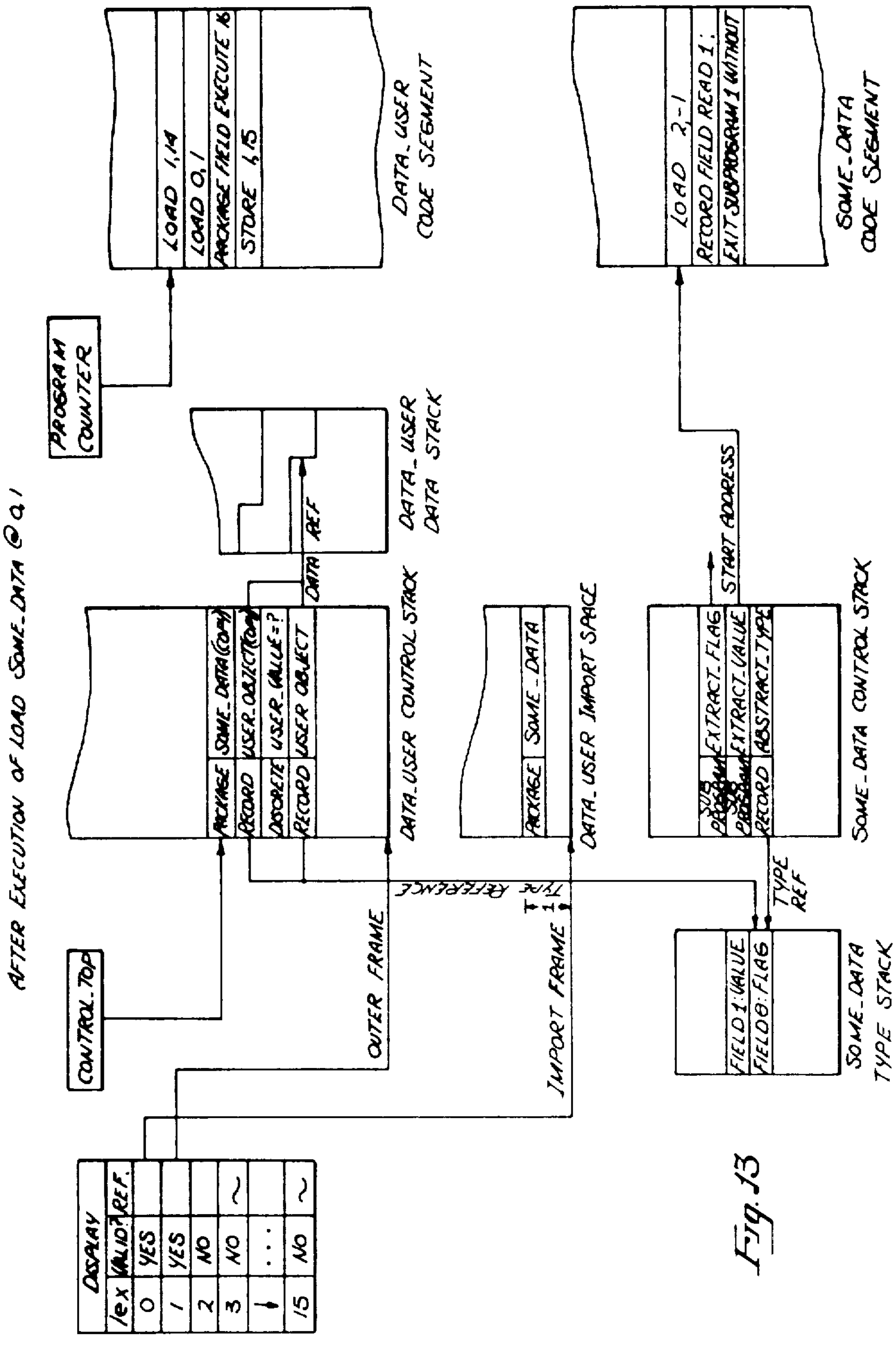

Referring to Timing Diagram, Chart 2; this load instruction performs essentially the same functions as the just-described Load Instruction 1, 14. The contents of the relevant memory segments after executing this instruction are shown in FIG. 13. It starts a reference to a different frame in the display and to a different offset in that frame. The result will be to push another word onto the top of the control stack. All of the references from 1 through 15 in the display are control space references. In this instruction the references is to Level 0 which is in import space.

As shown in FIG. 13, at this point after both load instructions have been executed, the record object USER_OBJECT has been copied to the top of the control stack and the package object SOME_DATA has been copied from the import space to the top of the control stack above USER_OBJECT. USER_OBJECT is a record object and it contains an address in its value half which points to some bit in a data stack. It points to where the data for the record actually is. SOME_DATA is a package variable which contains a segment name. This segment name references another control stack.

C. EXECUTE PACKAGE FIELD_EXECUTE, 16

Figure 14:
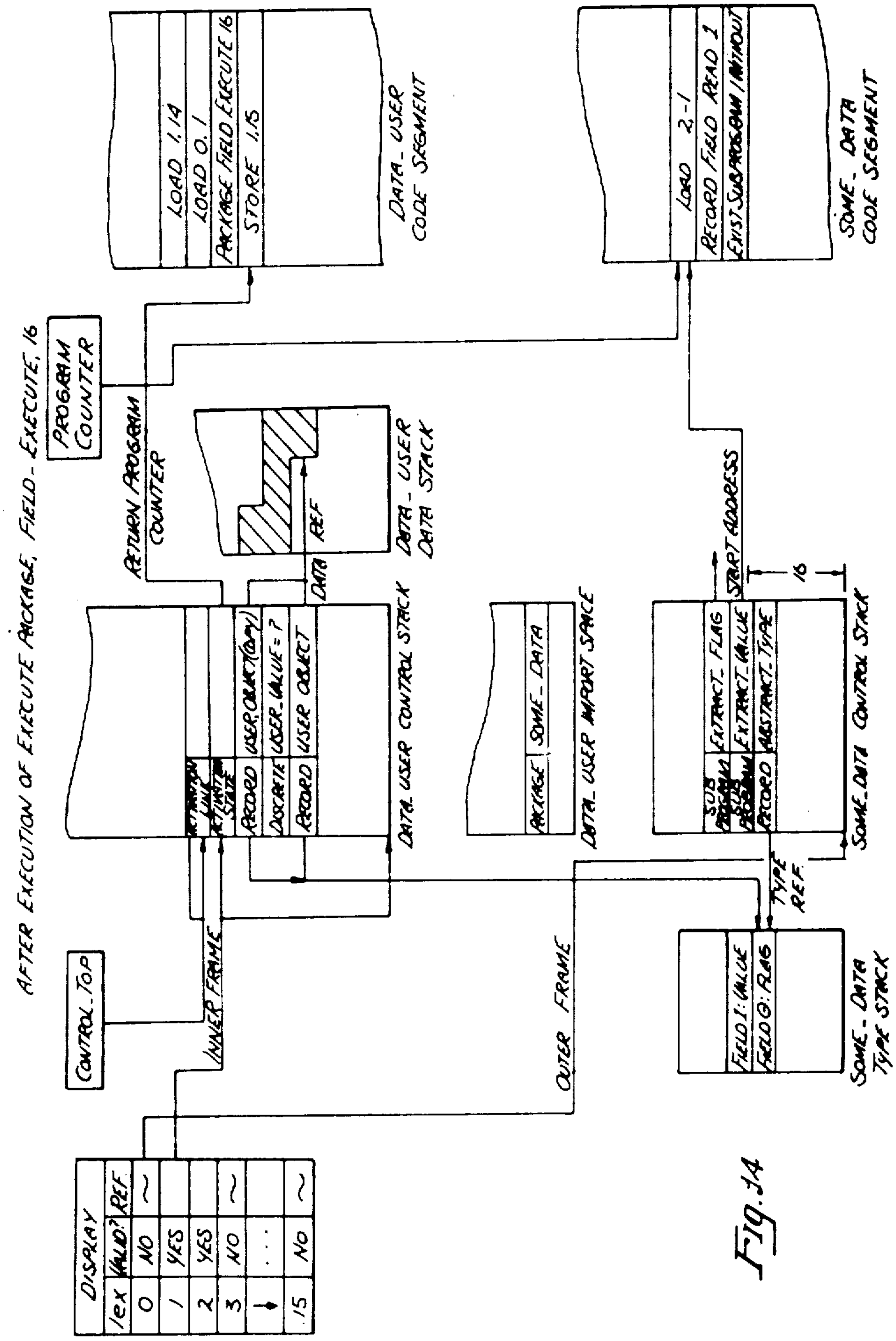

Referring to Timing Diagrams, Chart 3. The purpose of this instruction is to do a call to the subprogram in which USER_OBJECT is a parameter. This subprogram was declared in another package. therefore, on the control stack for SOME_DATA, there should be a subprogram object which was called EXTRACT VALUE. The contents of the relevant memory segments after executing this instruction are shown in FIG. 14.

Two mark words, an Activation Link and an Activation State, are pushed onto the control stack. The display is also updated so that the display entry at Lex Level 2 will point to these control words. The mark words, by recording the program counter, point to the store instruction, which is the next instruction that is to be executed upon return from the subprogram. The program branches to the Load, Execute Record Field Read, and Exits Subprogram which returns it to the Store instruction in the main program flow. The mark words also record the Static Link which is the enclosing frame which indicates where the subprogram is declared.

The mark words also record the current lex level where the task was executing, Lex Level 1 in this example. The mark words also record the tops of the type and data stacks, so that when an exit is executed, the type and data stacks can be popped. The mark words also keep track of the preceding dynamic frame. The program branches to the Load, Execute Record Field Read, and Exits Subprogram which returns it to the Store instruction in the main program flow. The mark words also record the Static Link which is the enclosing frame which indicates where the subprogram is declared.

Microcycle 0: the sequencer takes the Offset 16 from the instruction, and using its copy of SOME_DATA on the top of the control stack, it takes the segment name and starts a control read to that location in memory. This reads the subprogram object on the control stack for SOME_DATA. (This sequence takes place in parallel with Microcycle 2 of the Load Instruction 0, 1). In Microcycle 0, several checks are made. The first check is to make sure that the object on top of the control stack is a package object. This check is performed on the type board by examining the 7-bit tag. A further check is made to check the privacy of the object on top of the control stack. This accomplished by checking the Is Private bit. In this particular instruction the SOME_DATA package is visible to the instruction, so the Is Private bit is not set.

Microcycle/1: The segment name part of the package variable is sent from the value board over the FIU bus to the type board where it is stored in a general-purpose register. The sequencer then reads what is in the display at the current lex level and the data read is sent out on the type and value buses. Thus, the sequencer reads the display at Lex Level 1 and sends the information (an address) out over the type and value buses.

On the FIU board, the 20 bits of offset are extracted from that word. As part of the call operation this records where the last frame was. This is the frame in which the task is currently executing so that it can be recorded for when the program returns to this frame.

When the call to the subprogram is executed, the task was executing at Lex Level 1 and there was a pointer to where the current inner frame is. The sequencer produces the address which points to the current inner frame, and the FIU is used to extract the data at an offset from that address and storre it in one of its registers. This results in the preceding dynamic frame computation.

Microcycle 2: At this point, the package has been determined to be legal so that the address was correct, a copy of the package name is on the type board, and the inner frame is in one of the registers on the FIU board. The next step is to do a read RDR which fetches the subprogram variable, and places it on the type and value buses. The tag of the subprogram is checked to ensure first of all that it was of a find which is legal to do a call to, and a check is made to see that the subprogram has been elaborated in accordance with the rules placed by ADA.

At this point the configuration of the display on the sequencer board is as follows. At Lex Level 0 the Valid bit is reset. This is because when a call is made to another package, import spaces are changed. At Lex Level 1 the Valid bit is set. Lex Level 1 will point to the outer frame of the package that the program is calling to. At Lex Level 2 the Valid bit is set. Lex Level 2 will point to the current frame, that is, to the mark words that are being pushed.

The following describes how data is organized in the subprogram variable. In bits 0–31, there is the segment name which corresponds to the package that the Program is calling to. The subprogram variable is going to have the SOME_DATA package, so that is written into the display at this point and the Valid bit is set for Level 1.

The value half of the subprogram variable contains the program counter for the subprogram, so it contains the address of the first instruction of the subprogram. This is written into the macro PC register on the sequencer.

The lower-order bits, 124 through 127, of the subprogram variable contain the lex level at which that subprogram is declared. Since this is a subprogram declared at the outer scope of a package, it is going to be at Lex Level 2. Thus, the value 2 is written into the current lex register. The sequencer also keeps a copy of the return-program counter, that is, where the program will start executing upon return. Therefore, the contents of the current macro PC register are stored in the return PC register.

On the FIU board, the extractor extracts the part of the program counter which points to the offset in the code segment of where the program is going to start executing for the subprogram.

On the value board, the word returned on the value bus is stored and a Program Read is started. The part of the subprogram word that is on the value bus is used as a program counter to start a Read in order to get the instruction buffer for that subprogram. At this point, the hardware is starting a Read to the location in memory where the instructions are stored. (In this example there are three instructions that will be read.)

Microcycle 3: The sequencer is instructed to put the current control top, which the address of the top of the control stack, on the type bus and the value bus. Also put on the type bus and the value bus is the return-program counter. This return-program counter had been previously set to he current-program counter, which is the address of the store instruction. The sequencer is then instructed to put into the display at the current lex level (Lex Level 2) the information that is on the type and value buses, which is the control top. This is the address of the activation state.

The type board has the outer frame registered. The activation link word contains the name of the outer frame, type top, data top, etc. When the instruction is finished, the new outer frame will be the name of the package that is being called to. (Lex Level 1)

On the FIU board, the contents of the Value Assembly Register (VAR) and the contents of the Merge Data Register (MDR) are merged together. The current inner frame (20 bits) is put in the VAR. The value (12 bits) extracted from the program counter is put into the MDR. The result is 32 bits out of the two fields.

Microcycle 4: On the FIU board, the contents of the VAR are sent over the FIU bus. On the value board, the FIU bus and the data top are combined to make up the value word. At this point the control stack is pushed. Both of the mark words have now been written onto the top two words of the control stack.

Microcycle 5: The instruction buffer cannot be loaded and a dispatch cannot occur in the same microinstruction, so a Microcycle 5 of the Field Execute instruction is necessary. The Control PRED Register on the Sequencer remembers the preceding dynamic frame. The type and value boards keep a copy of the activation link word. These are written into the Context Activation Register written from the top of control stack. At the same time the Outer Frame Register used for privacy checking is updated to point to the package SOME_DATA.

If the instruction which is to be dispatched does not use the Control PRED Register, then the dispatch of that instruction will take place. Otherwise, a cycle must pass to wait for availability of the control PRED register.

D. LOAD 2, −1

Figure 15:
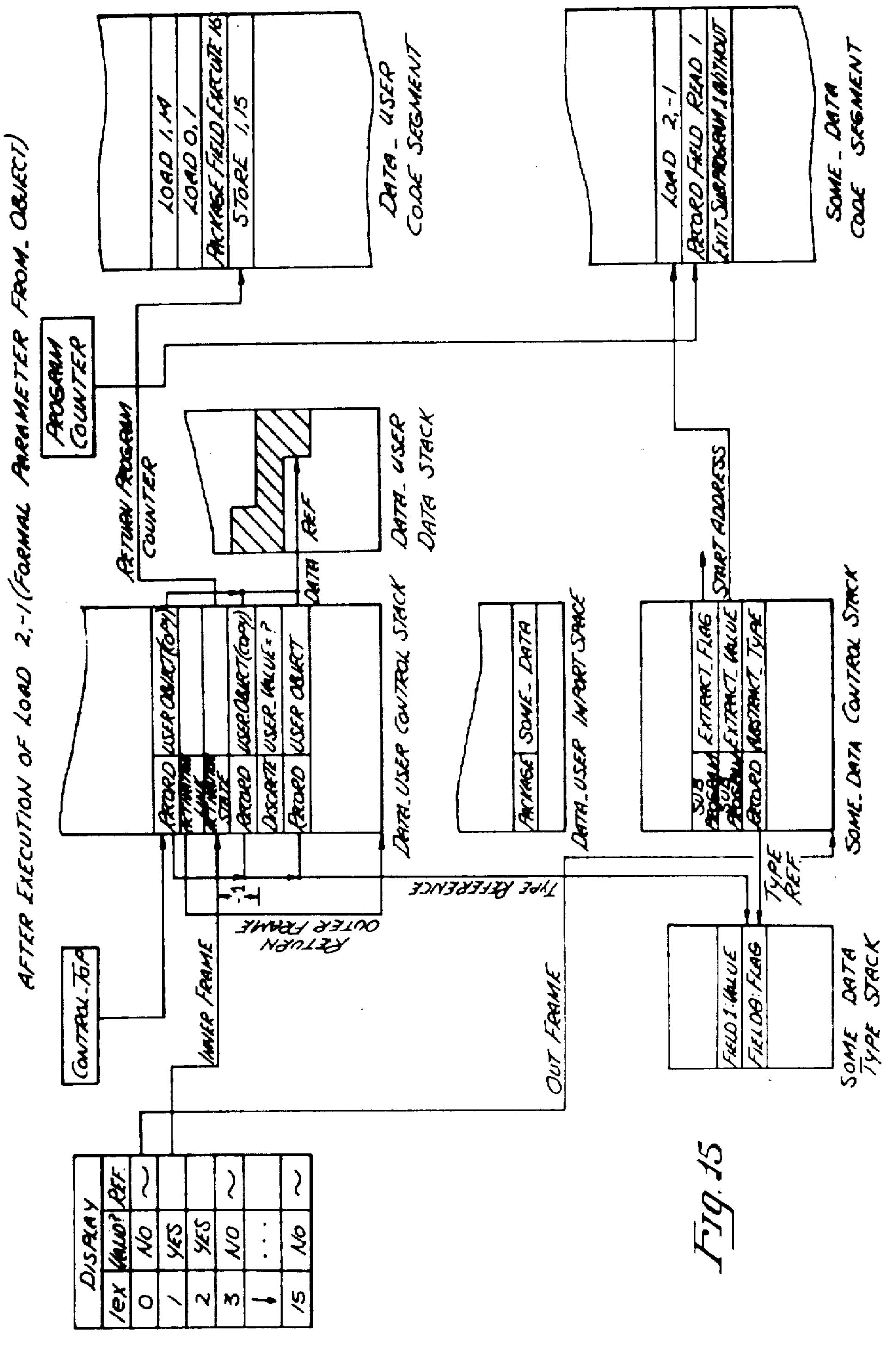

Referring to Timing Diagrams, chart 4, dispatching that next instruction involves updating the program counter so that it is now the Load 2, −1 instruction. The display is updated to point to the appropriate places. When the dispatch takes place, the sequencer will decode the Load 2, −1 instruction, start a control Read Off the Lex Level 2 display register, which is valid, will point to the current frame, and will offset −1. This will accomplish a load of the copy USER_DATA. When the data comes back, a second copy of the user object will be on top of the control stack. This copy has been obtained in a different way than the first copy, and in effect, it is a copy of the first copy. The contents of the relevant memory segments after executing this instruction are shown in FIG. 15.

E. EXECUTE RECORD, FIELD_READ

Figure 16:
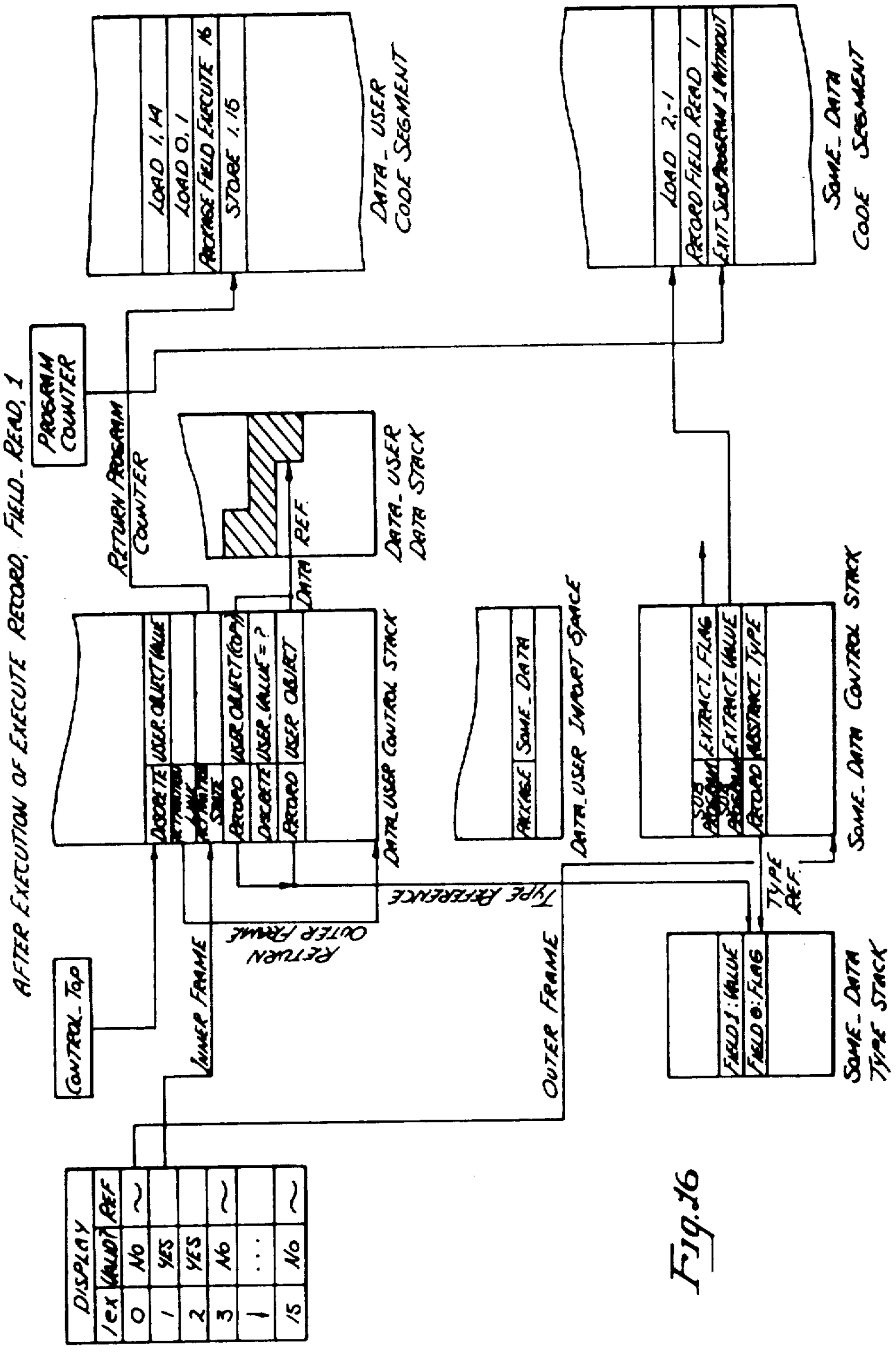

Referring to Timing Diagrams, Chart 5. What this instruction is attempting to do is take the record object and use it to get a discrete object which is the value field of that particular record and has the type integer, so that the USER_OBJECT on the top of the control stack is replaced with something which corresponds to the USER_OBJECT dot value. The contents of the relevant memory segments after executing this instruction are shown in FIG. 16.

What is on top of the control stack is the record object USER_OBJECT which was declared to have two fields being a flag and a value, 1 bit and 32 bits, respectively. The format of a Control Stack Object for a record includes a reference to a data stack where the actual data for the object is. Since it is a two-field record, there will be a 1-bit field and a 32-bit field. The value half contains the address of a data stack and the type half contains a type link which points to a type descriptor and has all of the protection bits along with a tag indicating that it is a record object. A type read to the top of control stack plus the field number is made. This instruction is an Execute, Record Field Read, where the field number is 1.

Microcycle 1: A test to see if the top of stack is a record by checking the tag is made. This is done on the type board. There is also a privacy check made of the word that is on the top of the control stack. The Check Privacy looks at the Is private bit to see if it is set. If it is, a further check is made to see if the name portion of this type link is the same as the current outer frame. If so, then execution is taking place in the scope of privacy of this record type and it is permissible to do a concrete operation such as Field Read. This is all done in the type checker.

Microcycle 2: The memory is returned. This is done by reading the RDR, and the data appears on the type and value buses. This information is to be put on the top of the control stack, so the sequencer is instructed to take what is on the type and value buses and put it in the top of control stack register. The sequencer is also instructed to check the field number. The type half of the field information word is the type of the field. In this case it is the type link for integer, and in particular a discrete, and not a private type. On the value half, the first 32 bits are the offset to the data for this field. The field number bits and the corresponding bits in the instruction are compared for equality. This prevents the reading of, for example, the seventh field of a two-field record.

On the value board, the data that appears on the value bus is added to the data which is on top of the control stack. This results in the address of the new data which is put out on the address bus. The FIU is instructed to latch the information on the address bus, the value bus, and the type bus. The FIU has special registers which can extract only the data that is needed. The 7-bit-size field on the value bus tells the FIU how much of the 128-bit word is to be extracted.

Microcycle 3: The "Is Constant" bit is extracted out of the record object and is merged into the type link of the integer that is being put on the control stack. This is a way of propagating the Is Constant bit. The returned data is put into the RDR.

Microcycle 4: The next step is to read the RDR. The FIU is instructed to extract using the latched field information, and the extracted data is placed on the FIU bus. The information on the FIU bus is then placed on the top of the control stack.

On the type board, the Is Constant bit is also put on the top of the stack and a dispatch is commanded.

F. EXIT_SUBPROGRAM 1, WITH_RESULT

Figure 17:
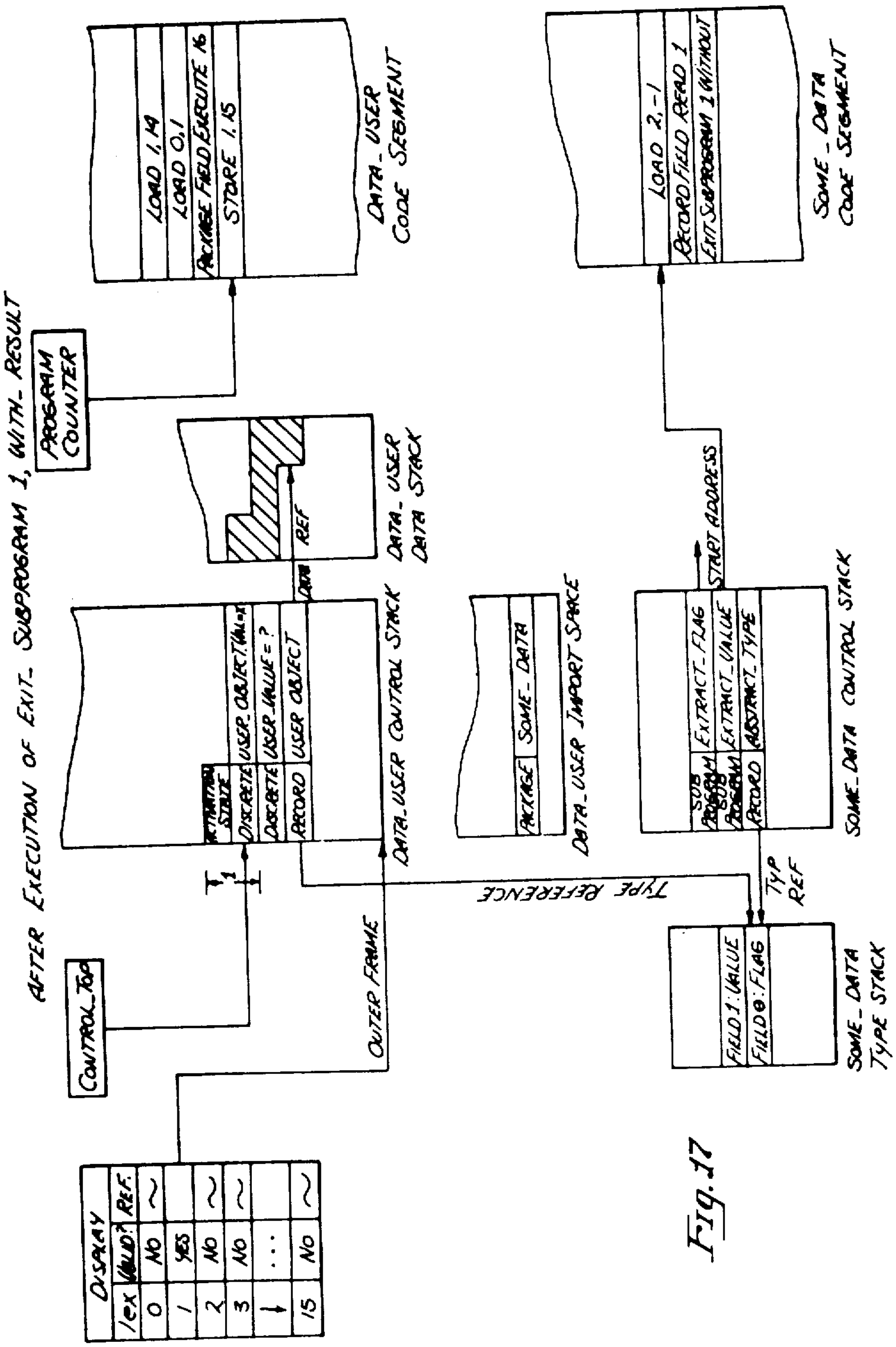

Referring to Timing Diagrams, Chart 6. The name of the outer frame is the package SOME_DATA and the outer frame register is set equal to SOME_DATA. The inner frame, minus the number 1 in this case, indicates there the new top of the control stack is going to be. So, upon execution of the exit subprogram instruction, the frame will be popped off and one additional parameter will be popped off. Therefore, the control top will be equal to the old inner frame −1, wherein the 1 came from the instruction. So, in effect, the instruction pops off the two mark words, overwriting USER_OBJECT (which was the parameter of the call) with the value that is on top of the control stack. This is USER_OBJECT.VALUE (integer field). The exit function instruction then sets up the environment so that the new inner frame is located here. All of the addressing environment is restored to this frame, the program counter is restored to this frame, and the display is set up to be associated with this frame such that the environment before the subprogram call is restored. The contents of the relevent memory segments after executing this instruction are shown in FIG. 17.

Microcycle 0: The sequencer is instructed that one object is needed on top of the control stack (i.e., the control stack accelerator), a copy of the object which is going to be returned. No other registers are needed to be free. A Control Read is started offset from the inner frame, where the offset is the new top offset in the instruction. The sequencer thus starts a Control Read to this location. In addition to doing this memory read, the sequencer also does the computation of inner frame minus the Offset (−1) and stores it in the Save Offset Register on the sequencer board.

Microcycle 1: The object on top of the Control Stack (function result) is saved in the general-purpose register. A tag check is made to make sure that what is being returned is legal to be returned. The tag is sent over the address bus and the FIU latches this information for later use.

On the type board, a check is made to see if this operation is in a special frame, by checking information in the activation link (i.e., a stored copy of the activation link). First of all, it checks to see if any packages or tasks have been declared (child list information), in order that a wait period can be taken until these packages or tasks terminate before exiting.

Microcycle 2: Data at inner frame−1 is returned from memory. Its tag is checked to ensure that the result is not overwriting a mark word or other special control word.

The sequencer starts memory at Control PRED to retrieve the two mark words. This read operation will encompass all of the information needed to restore the environment for this frame (Lex Level 1; the return PC; the enclosing frame; the outer frame=DATA USER; the new type stack top; and the data stack top, all stored in the two mark words).

The FIU is used to extract a number of bits from the tag of the result. The FIU puts the bits of the tag that the sequencer will case on the FIU bus. Both mark words are read, and the sequencer is instructed to invalidate all of the lex levels.

Microcycle 3: A check is made to make sure that the stack was not popped down too far. A general purpose register stores the top of the type stack, and this is manipulated to get the type frame out of the activation link. This is done to reclaim the space used for any types which may have been declared. The sequencer cases on the FIU bus. Using this information the sequencer computes what the next microaddress will be (the case function result kind microaddress plus the value that was on the FIU bus in the previous cycle).

Microcycle 4: What is returned from memory is the activation state of the preceding frame. A hardware check is made to ensure that the tag is for an activation state. Whenever a reference is started using the display or Control PRED, the reference should always point to an activation state. Next, the incoming lex is validated. The sequencer takes whatever is in the four most significant bits (the lex level of the frame that is being return to), subtracts 1 from it, and validates the display at that point. This will validate Lex Level 0 with the data that is coming back on the value bus. In addition to the lex level, the return PC value is stored, that is the frame that the program will return to. The macro PC is assigned that return PC value even though this is not where the program wants to start executing. The sequencer also puts the Save Offset register on the address bus and does a Start Pop-Down To. This is a two-cycle operation which places what is on the address bus onto the top of control stack. By the end of the cycle, the Control Stack Accelerator is in a clean state as to what is valid and what is not, and the control top is where it is supposed to be.

A check is also made to be sure that the type that is being returned was not declared in this frame.

Microcycle 5: The sequencer reads the RDR and validates the outer frame. This validates Lex Level 1 and puts into the display at Lex Level 1 the data (the name of DATA_USER) that was on the type bus in positions 0-31. Next, the sequencer extracts from the type and value bus the next frame pointed to be Control PRED in the mark word. The outer-frame latch on the type board is set to the package name DATA_USER and the copy of the activation link is updated on the type board. The sequencer places the Return PC on the address bus and Program Read is started. Now a Program Read is started. The instruction buffer will in Cycle 7 be filled with the word that contains the store instruction because that is where the Return PC points to.

Microcycle 6: The sequencer is instructed to validate the current lex level and Control PRED is put on the FIU bus, which is the address of this frame which is going to be the new inner frame.

Microcycle 7: The sequencer reads the RDR and fills the instruction buffer on the sequencer. The import frame is invalidated at Lex Level 0. The Control Top register on the sequencer is set to point to this location. The copy of the activation link register is set. Finally, a Push Control Stack is undertaken.

Microcycle 8: The result copied is moved onto the top of the control stack, that is USER_OBJECT.VALUE and this is also in the Control Stack Accelerator. A class check is performed on the activation link copy. As shown in FIG. 17, after execution of this instruction, the object USER_OBJECT.VALUE is left on the top of the control stack and a dispatch is performed.

G. STORE 1, 15

Figure 18:
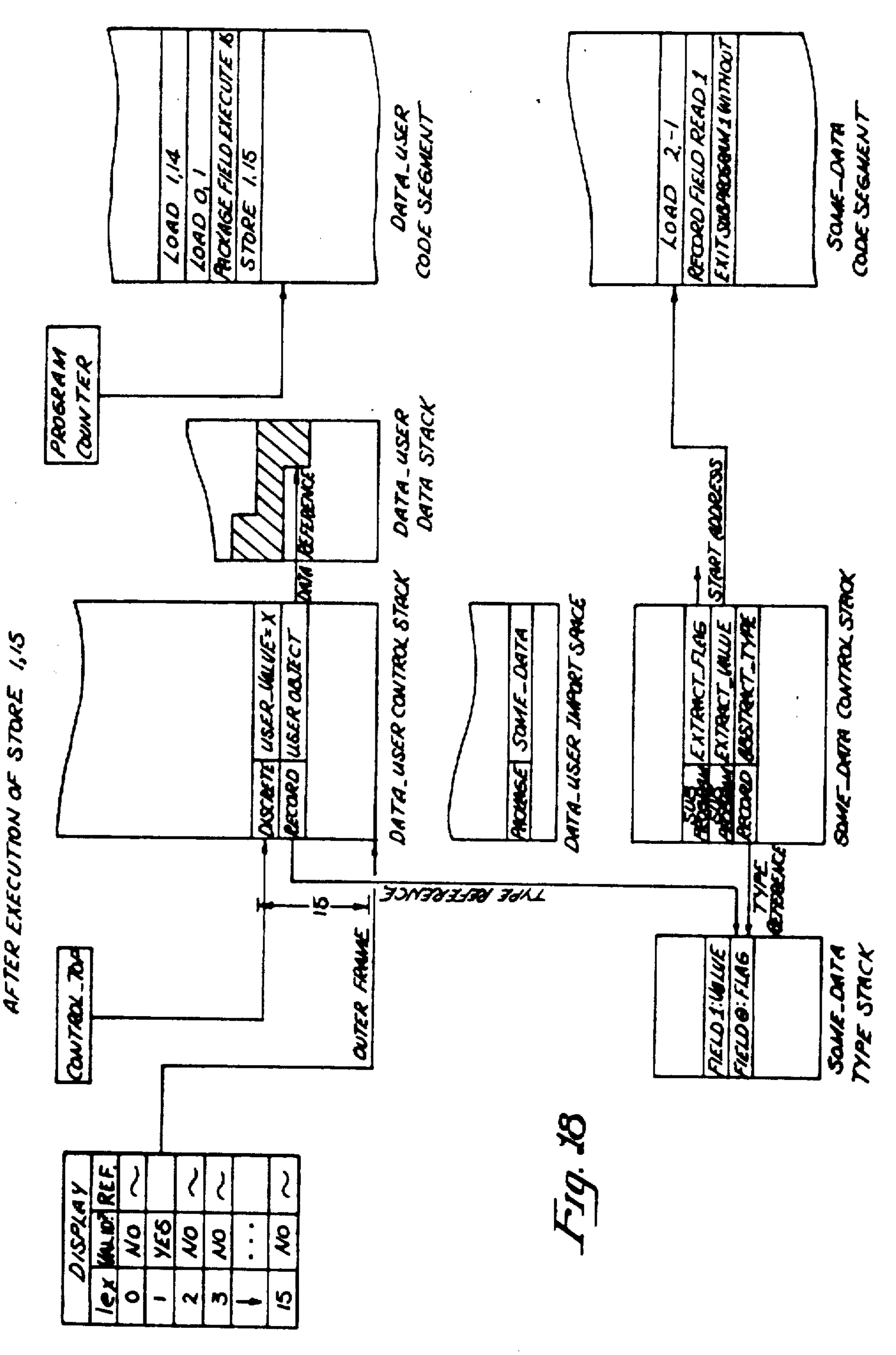

Referring to Timing Diagrams, Chart 7. What has been done up to this point is a call to SOME.DATA.EXTRACT VALUE where the parameter USER_OBJECT is passed, and this is to be stored into the integer USER_VALUE. On top of the control stack is the field that was extracted from the record. The store instruction will take the value part of this and store it in the value part of USER_VALUE. Under the ADA rules, if a Store Operation is performed, a Constraint Check must be made. This means that the value has to lie within the bounds of the type. The contents of the relevant memory segments after executing this instruction are shown in FIG. 18.

Microcycle 0: The store starts a control read at Lex Level Delta. The sequencer does a read operation at Lex Level 1 and reads the object at Offset 15.

Microcycle 1: The memory address of the store is saved in a general-purpose register on the Value board.

Microcycle 2: The data is read and the type and value sides of it are kept. From the tag value five bits are extracted and a check is made to make sure that it is a type variable. If it is typed, a Type Read is started. The value points to the type stack where there is a descriptor that contains the minimum value and maximum value allowed for the type.

Microcycle 3: The suquencer does a case of the FIU bus (the five bits of the tag that were extracted). A check is made to make sure that the object on top of the control stack is a discrete. A Privacy Check is made for a limited operation which checks to see if either one is private; if the privacy bits are set then, are their names the current outer frame and if not, are their names the same.

Microcycle 4: Provide the data that is going to be written in Cycle 5 by loading the write data register (WDR).

Microcycle 5: The data to be written is the old type plus the new value.

Microcycle 6: The control stack is popped and ALU operations are performed to check that the value that is being written is a legal value as within the range of the minumum and maximum permissible values. If the value is within the range a dispatch is performed.

CHART 1

Instruction 1-LOAD 0, 14 (2 cycles)

| Decode | Cyc 1 | Cyc 2 | Cyc 3 | Cyc 4 | Cyc 5 | Cyc 6 | Cyc 7 | Cyc 8 |
|---|---|---|---|---|---|---|---|---|
| TYPE bus | | Type half of USER_ OBJECT record | | | | | | |
| VALUE bus | | Value half of USER_ OBJECT record | | | | | | |
| FIU bus | | 3 bits xtrctd from tag of USER_ OBJECT | | | | | | |
| ADDRS bus | Cntrl Read at Offset 14 frm display lvl 1 | | | | | | | |
| CNTRL STACK | | Push (USER_ OBJCT) | | | | | | |
| NOTES | Seqncr gens addr and starts read | Type board checks tag of USER_ OBJECT and resets IS_ VISIBL bit | | | | | | |

CHART 2

Instruction 2-LOAD 0, 1 (2 cycles)

| | | |
|---|---|---|
| TYPE bus | | Type half of SOME_ DATA pkg |
| VALUE bus | | Value half of SOME_ DATA pkg |
| FIU bus | | 3 bits xtrctd from tag of SOME_ DATA |
| ADDRS bus | Import Read @ offset 1 in curnt Import space | |
| CNTRL STACK | | Push (SOME_ DATA |
| NOTES | Seqncr gens addr and starts read | Type board checks tag of SOME_ DATA & resets Is_ VISIBL bit |

CHART 3

Instruction 3-EXECUTE PACKAGE, FIELD_EXECUTE, 16 (5 cycles)

| Decode | Cyc 1 | Cyc 2 | Cyc 3 | Cyc 4 | Cyc 5 | Cyc 6 | Cyc 7 | Cyc 8 |
|---|---|---|---|---|---|---|---|---|
| TYPE bus | Disply at curnt lex level | Type half of SOME_DATA. XTRACT_VALUE subpgm | Curnt Top of Stack ref from seqncr | First half of Nstrcn buffer for subpgm | | | | |
| VALUE bus | Curnt Pgm Countr | Value half of SOME_DATA. XTRCT_VALUE subpgm | Return pgm countr from seqncr | Second half of Nstrcn Buffer for subpgm | | | | |
| FIU bus | Value half of top of stk (SOME_DATA pkg | | | Cntrl PRED offset and block start offset | Cntrl PRED from FIU to seqncr | | | |
| ADDRS bus | Cntrl Read at Offset 16 from value half of top of stk | | Pgm Read at start addrs for subpgm | | | | | |
| CNTRL STACK | | | | | Push (ACTIVATIN_STATE mark word) | Push (ACTIVATIN_LINK mark word) | | |
| NOTES | Seqncr gens addr and starts rad | FIU xtrcts offset from TYPE bus<br>TYPE board checks tag, vsblty and elabn state of subpgm | VAL board gens addrs and starts read; | | | | | |

CHART 4

Instruction 4- LOAD 2, −1 (2 cycles)

| Decode | Cyc 1 | Cyc 2 | Cyc 3 | Cyc 4 | Cyc 5 | Cyc 6 | Cyc 7 | Cyc 8 |
|---|---|---|---|---|---|---|---|---|
| | | TYPE bus | | | Type half of FROM_OBJECT record | | | |
| | | VALUE bus | | | Value half of FROM_OBJECT record | | | |
| | | FIU bus | | | 3 bits xtrcd from | | | |

-continued

CHART 4
Instruction 4- LOAD 2, −1 (2 cycles)

| Decode | Cyc 1 | Cyc 2 | Cyc 3 | Cyc 4 | Cyc 5 | Cyc 6 | Cyc 7 | Cyc 8 |
|---|---|---|---|---|---|---|---|---|
| | | | | | tag of<br>FROM_<br>OBJECT | | | |
| | | | ADDRS<br>bus | Cntrl<br>Read<br>at<br>offset<br>−1 frm<br>display<br>lvl 2 | | | | |
| | | CNTRL<br>stack | | | Push<br>(FROM_<br>OBJCT) | | | |
| | | NOTES | Seqncr<br>gens<br>addr<br>and<br>starts<br>read | | Type<br>board<br>checks<br>tag of<br>FROM_<br>OBJECT<br>and<br>resets<br>Is_<br>Visibl<br>bit | | | |

CHART 5
Instruction 5-EXECUTE RECORD, FIELD_READ, 1 (4 cycles)

| Decode | Cyc 1 | Cyc 2 | Cyc 3 | Cyc 4 | Cyc 5 | Cyc 6 | Cyc 7 | Cyc 8 |
|---|---|---|---|---|---|---|---|---|
| TYPE | | Type<br>half<br>of<br>dcrptr<br>for<br>field<br>ABSTR_<br>TYPE.<br>VALUE | | Type<br>half<br>of<br>data<br>word<br>which<br>cntns<br>field<br>USER_<br>OBJECT<br>.VALUE | | | | |
| VALUE<br>bus | | Value<br>half<br>of<br>descrptr<br>for<br>field<br>ABSTR_<br>TYPE.<br>VALUE | | Value<br>half<br>of<br>data<br>word<br>which<br>cntns<br>field<br>USER_<br>OBJECT<br>.VALUE | | | | |
| FIU<br>bus | | Type<br>half<br>of top<br>of stk<br>(for<br>Is_<br>Constr<br>bit) | | Type<br>half<br>field<br>ABSTR_<br>TYPE.<br>VALUE<br>dcrptr<br>with<br>Is_<br>Const<br>bit<br>prpgtd | Data<br>xtrctd<br>from<br>TYPE<br>& VAL<br>buses<br>(USER_<br>OBJCT.<br>VALUE) | | | |
| ADDRS<br>bus | Type<br>Read<br>at<br>offset<br>1 frm<br>type<br>half<br>of<br>top of<br>stack | | Data<br>Read<br>at<br>addrs<br>formed<br>by top<br>of stk<br>+ low<br>32-bts<br>of<br>VAL<br>bus | | | | | |
| CNTRL | | | | | | | | |

-continued

CHART 5

Instruction 5-EXECUTE RECORD, FIELD_READ, 1 (4 cycles)

| Decode | Cyc 1 | Cyc 2 | Cyc 3 | Cyc 4 | Cyc 5 | Cyc 6 | Cyc 7 | Cyc 8 |
|---|---|---|---|---|---|---|---|---|
| STACK NOTES of stk | Seqncr gens addrs and start read read | TYPE board checks class & pvcy of top | VAL board gens addrs and starts | Top of stack is over-writtn | | | | |

CHART 6

Instruction 6-EXIT_SUBPROGRAM 1, WITH_RESULT (8 cycles)

| Decode | Cyc 1 | Cyc 2 | Cyc 3 | Cyc 4 | Cyc 5 | Cyc 6 | Cyc 7 | | Cyc 8 |
|---|---|---|---|---|---|---|---|---|---|
| TYPE bus | SAVE_ OFFSET regstr from seqncr | Type half of Object at SAVE_ OFFSET (New top of stack) | | Type half of ACTVN_ STATE for prcdng frame (dsply at Nclsng frame) | Type ½ of ACTVN_ LINK for prcdng frame (Outer frame & type stack frame) | | First ½ of Nstrcn Buffer for return | Type half of subpgm result | |
| VALUE bus | Curnt pgm Countr | Value half of Object at SAVE_ offset | (New top of stack) | Conts of the Memory Addrs Regstr (new inner frame) | Value half of ACTVN_ STATE for prcdng frame (new return pgm countr & new lex level) | Value half of ACTVN_ LINK for prcdng frame (new Cntrl PRED & data stock stock | Second half of Nstrcn Buffer for return stack frame) | Value half of subpgm result | |
| FIU bus subpgm result | | Conts of the memory Addrs Regstr (new top of stack | 4 bits xtrctd from the tag of the object at top of stk | Curnt top of the type stack | Type half of the top of stack | Os | New offset for prcdng frame (new Cntrl PRED | New offset of cntrl top | Type half sub progr result |
| ADDRS bus | Cntrl Read @ curnt inner frame minus offset 1 | Tag of result | Cntrl Read @ prcdng frame for read of ACTVN_ STATE | Cont. for read of ACTVN_ LINK | SAVE_ OFFSET Regstr from seqcnr | Return Pgm Countr from seqcnr | | | |
| CNTRL STACK | | | | | START_ POP_ DOWN | FINISH_ POP_ DOWN | POP | PUSH | |
| Notes | Seqcnr gens adrs & starts read; inner frame offset −1 is put in SAVE_ OFFSET | Type board cks if frame has local tasks/ pkgs of if utilty or rndzvs | Seqcnr starts read using Cntrl_of PRED regstr | Case on tag of the top stk | Cntrl stack top is now below frame of exit | Cntrl stack is popped so result may be put in the cntrl stack aclrtr | | Top of stack optmzr is valdtd | |

-continued

| CHART 6 Instruction 6-EXIT_SUBPROGRAM 1, WITH_RESULT (8 cycles) | | | | | | | | |
|---|---|---|---|---|---|---|---|---|
| Decode | Cyc 1 | Cyc 2 | Cyc 3 | Cyc 4 | Cyc 5 | Cyc 6 | Cyc 7 | Cyc 8 |
| | rgstr | frame | | | | | | |

| CHART 7 Instruction 7 - Store 1,15 (6 cycles) | | | | | | | | |
|---|---|---|---|---|---|---|---|---|
| Decode | Cyc 1 | Cyc 2 | Cyc 3 | Cyc 4 | Cyc 5 | Cyc 6 | Cyc 7 | Cyc 8 |
| TYPE | | Type half of the object at lvl 1, offset 15 (USER_ VALUE) | | Type half of dcrptr for USER_ VALUE (INTE- GER' FIRST) | Type half of object USER_ VALUE | | | |
| VALUE bus | Conts of the Memory Addrs Rgstr | Value half of the object at lvl 1, offset 15 | | Value half of dcrptr for USER_ VALUE (INTE- GER' LAST) | Value half of top of stk (USER_ OBJECT .VALU) | | | |
| FIU | | | 4 bits xtrctd from the tag of USER_ | addres of USER_ VALUE | Value half of top of stk (USER_ .VALU) | | | |
| ADDRS bus | Cntrl Read at offset 15 from disply | | Type Read at dcrptr for USER_ VALUE | | Cntrl Write at offset 15 frm display lvl 1 | | | |
| CNTRL STACK | | | | | | | POP | |
| NOTES | Seqncr gens addrs and starts read | | Type board uses value on TYPE bus to start read | Case on tag of USER_ VALUE | VAL board gens addrs and starts write | | Cnstrt check is prfmd on new value, write write contrl dates | |

Thus, computer architecture and an apparatus for implementing the architecture has been described. The computer is particularly useful for use with fourth generation computer languages.

We claim:

1. A digital computer for operating upon a program which includes a plurality of program units (modules), comprising:

a memory for storing, for each of said modules;

a control segment containing control segment words representing task control blocks, activation records, parameters and locally declared objects, said control segment words containing a kind descriptor which identifies said parameters and locally declared objects as belonging to one of a plurality of object classes,;

a code segment containing instructions for said computer relating to said modules;

a data segment containing data;

a type segment containing type descriptors for types declared in said module, said type descriptors defining constraints of objects of said type;

a processing means coupled to said memory for creating frames in said control segment for activation of subprograms within said module based on said activation records, said frames comprising a plurality of said control segment words for each of said subprograms' parameters and locally declared objects, and for executing said subprograms within said module by obtaining instructions from said code segment, said instructions referencing said parameters and locally declared objects within the current frame for computation, constraint checking and privacy checking, a portion of said control segment words directly representing a value of said objects or indirectly representing a value of said objects by referencing data in said data segment, said control segment words of said current frame referencing type information in said type segments for said constraint checking and said privacy checking;

whereby improved operations on said program are achieved.

2. The computer defined by claim 1 wherein said memory also stores for at least some of said modules a queue segment containing queuing messages to synchronize execution by said processing means of modules representing tasks.

3. The computer defined by claiim 2 wherein said memory additionally stores for at least some of said modules an import segment which contain messages controlling accessibility by said processing means of objects in different ones of said modules.

4. The computer defined by claims 1 or 3 wherein said object classes include packages, tasks, discrete objects, floating point objects, records and arrays.

5. The computer defined by claim 4 wherein said referencing of data in said data segment is to said records and arrays.

6. A computer for operating on a program which program includes a plurality of modules, comprising:

a memory for storing a control segment, code segment, data segment and type segment for each of said modules;

a sequencer coupled to said memory for receiving instructions from said code segment and for providing control signals for said computer;

a first processing means coupled to said memory for receiving first signals from control segments, data segments and type segments and for manipulating said first signals under control of said control signals from said sequencer;

a second processing means coupled to said memory for receiving second signals from said control segment and type segment and for manipulating said second signals under control of said control signals from said sequencer;

a first bus for coupling said first signals from said memory to said first processing means and for coupling signals from said first processing means to said memory;

a second bus for coupling said second signals from said memory to said second processing means and for coupling signals from said second processing means to said memory;

an address bus for providing address signals for said memory, said address bus coupled to said sequencer, said first and second processing means and said memory, said control segment including control segment words having a first field, said first field containing discrete values or pointers to data structures in said data segment, said first field being coupled to said first processing means by said first bus, and a second field containing pointers to type descriptors in said type segment, said second field being coupled to said second processing means by said second bus, whereby improved operations on said program are achieved.

7. The computer defined by claim 6 wherein said first and second processing means operate simultaneously under the control of certain ones of control signals from said sequencer.

8. The computer defined by claim 7 including a field isolation unit for extracting bits from and inserting bits into words of said data segments, said field isolation unit being coupled to said memory and said first and second processing means.

9. The computer defined by claim 7 or claim 8 wherein said control signals from said sequencer comprise microcode address signals.

10. The computer defined by claim 9 wherein said microcode address signals are also coupled to said field isolation unit.

11. The computer defined by claim 6 wherein said data segment stores records and arrays.

12. The computer defined by claim 6 wherein said memory also stores for each of said modules a queue segment containing synchronization messages between modules representing tasks.

13. The computer defined by claim 6 wherein said memory additionally stores for each of said modules an import segment containing lists of objects outside said module while are accessible within said module.

14. The computer defined by claim 6 wherein said first and second buses and control signals from said sequencer are coupled to an interface circuit to allow said computer to be coupled to a system bus.

15. A computer comprising:

a memory;

segments of instructions executable by said computer and a plurality of non-instruction segments, said segments being stored in said memory, said instructions including first-access information;

a processor for executing said instructions, said processor including;

instruction decoding means coupled to said memory, for decoding said instructions to provide control signals for said processor;

first logic means coupled to said instruction decoding means and to said memory for using said first-access information to locate a first one of said non-instruction segments, said first-access information additionally being used to locate a first word within said first non-instruction segment;

said first word contained within said first non-instruction segment including a type part and a kind descriptor which identifies parameter and locally declared objects as belonging to one of a plurality of object classes, said type part including second-access information, said first word contained within said first non-instruction segment also being used for data contained within said memory;

second logic means coupled to said instruction decoding means and to said memory for using said second-access information to locate a second one of said non-instruction segments, said second-access information additionally being used for locating a type descriptor contained within said second non-instruction segment;

said processor manipulating upon said type descriptor and data under the control of said control signals, whereby modules of a computer program represented by said segments are operated on by said computer.

16. The computer defined by claim 15 wherein first word contains said data.

17. The computer defined by claim 15 wherein said first word includes third-access information and wherein third logic means coupled to said instruction decoder means and to said memory is used to locate a third one of said non-instruction segments stored in said memory, said third-access information additionally being used to locate said data within said third non-instruction segment.

18. The computer defined by claims 15 or 17 wherein said memory additionally stores a queue segment containing synchronization messages between modules representing tasks.

19. The computer defined by claims 15 or 17 wherein said memory also stores for each module an import segment containing list of objects outside one of said module which are accessible within said one module.

* * * * *

UNITED STATES PATENT AND TRADEMARK OFFICE
CERTIFICATE OF CORRECTION

PATENT NO. : 4,791,550

DATED : 12-13-88

INVENTOR(S) : Stevenson et al.

It is certified that error appears in the above-identified patent and that said Letters Patent is hereby corrected as shown below:

| Column | Line | Correction |
|---|---|---|
| 12 | 25-6 | delete "microprocessor", insert --microsequencer-- |
| 37 | 13 | delete "claiim", insert --claim-- |

Signed and Sealed this

Twenty-sixth Day of September, 1989

Attest:

DONALD J. QUIGG

*Attesting Officer*

*Commissioner of Patents and Trademarks*